United States Patent
Theiss

(10) Patent No.: US 9,811,079 B2
(45) Date of Patent: Nov. 7, 2017

(54) SYSTEMS AND METHODS FOR WIRELESS MONITORING AND CONTROL OF COUNTERMEASURE DISPENSER TESTING SYSTEMS

(71) Applicant: L-3 Communications Integrated Systems L.P., Waco, TX (US)

(72) Inventor: Alton W Theiss, Whitney, TX (US)

(73) Assignee: L-3 Communications Integrated Systems, L.P., Waco, TX (US)

( * ) Notice: Subject to any disclaimer, the term of this patent is extended or adjusted under 35 U.S.C. 154(b) by 812 days.

(21) Appl. No.: 14/138,862

(22) Filed: Dec. 23, 2013

(65) Prior Publication Data

US 2015/0331417 A1 Nov. 19, 2015

(51) Int. Cl.

| G06F 19/00 | (2011.01) |
|---|---|
| G05B 23/00 | (2006.01) |
| H04B 17/10 | (2015.01) |
| H04B 17/20 | (2015.01) |
| G05B 19/042 | (2006.01) |

(52) U.S. Cl.
CPC ......... *G05B 23/00* (2013.01); *G05B 19/0428* (2013.01); *H04B 17/10* (2015.01); *H04B 17/20* (2015.01)

(58) Field of Classification Search
CPC .... G05B 23/00; G05B 19/0428; H04B 17/10; H04B 17/20; B64D 1/02; B64D 1/08; F42B 12/70
USPC ........................................... 702/122; 89/1.51
See application file for complete search history.

(56) References Cited

U.S. PATENT DOCUMENTS

| 8,986,011 | B1* | 3/2015 | Sowadski | G09B 9/301 434/29 |
|---|---|---|---|---|
| 2006/0282735 | A1* | 12/2006 | Weinraub | G01R 31/31905 714/742 |
| 2007/0201386 | A1* | 8/2007 | Desai | H04B 17/20 370/278 |
| 2012/0018581 | A1* | 1/2012 | Melin | B64D 1/02 244/137.1 |
| 2014/0138474 | A1* | 5/2014 | Sharpin | F41H 11/02 244/3.22 |

OTHER PUBLICATIONS

BAE Systems ALE 47, 2008, pp. 1 and 2.*
Symetrics, AN/ALE-47 CMDS, countermeasures Dispenser System, Nov. 2012, 2 pgs.

(Continued)

*Primary Examiner* — David M Gray
*Assistant Examiner* — Geoffrey T Evans
(74) *Attorney, Agent, or Firm* — Egan, Peterman, Enders Huston, LLP.

(57) ABSTRACT

Systems and methods are provided for testing aircraft countermeasure dispenser systems (CMDS) by wirelessly monitoring and controlling wireless countermeasure dispenser testing system units (WCDTs). The disclosed systems and methods may be implemented in one example to allow functions of multiple WCDT units to be simultaneously monitored and controlled in real time via a wireless connection or wireless network connection such as wireless local area network (WLAN) or other short or long range wireless network.

25 Claims, 9 Drawing Sheets

(56) References Cited

OTHER PUBLICATIONS

Symetrics, AN/ALM-295 CDT, Countermeasures Dispenser Test Set, Nov. 2012, 2 pgs.
BAE Systems, Countermeasures Dispenser Tester, State-Of-The-Art Test Equipment for Countermeasures Dispenser Systems, 2008, 2 pgs.
Force, Digital Intercommunications System, L3, Obtained from Internet May 2013, 2 pgs.
Haystead, US Helicopter EW, Next Generation Rotocraft ASE Systems Reserved for Newer Platforms, Journal of Electronic Defense, Mar. 2012, 3 pgs.
News Releases, U.S. Army Selects Northrop Grumman To Provide Advanced AN/APR-39 Radar Warning Receivers, Printed From Internet Sep. 6, 2013, 1 pg.
News Releases, Northrop Grumman Receives Phase Two Contract To Upgrade APR-39 Radar Warning Receiver For CH-53K Helicopter Fleet, Feb. 18, 2008, 2 pgs.
ATK, AN/AAR-47 Missile Warning System, Multi-Threat Detection: Missile, Laser, and Hostile Fire, May 30, 2011, 2 pgs.

* cited by examiner

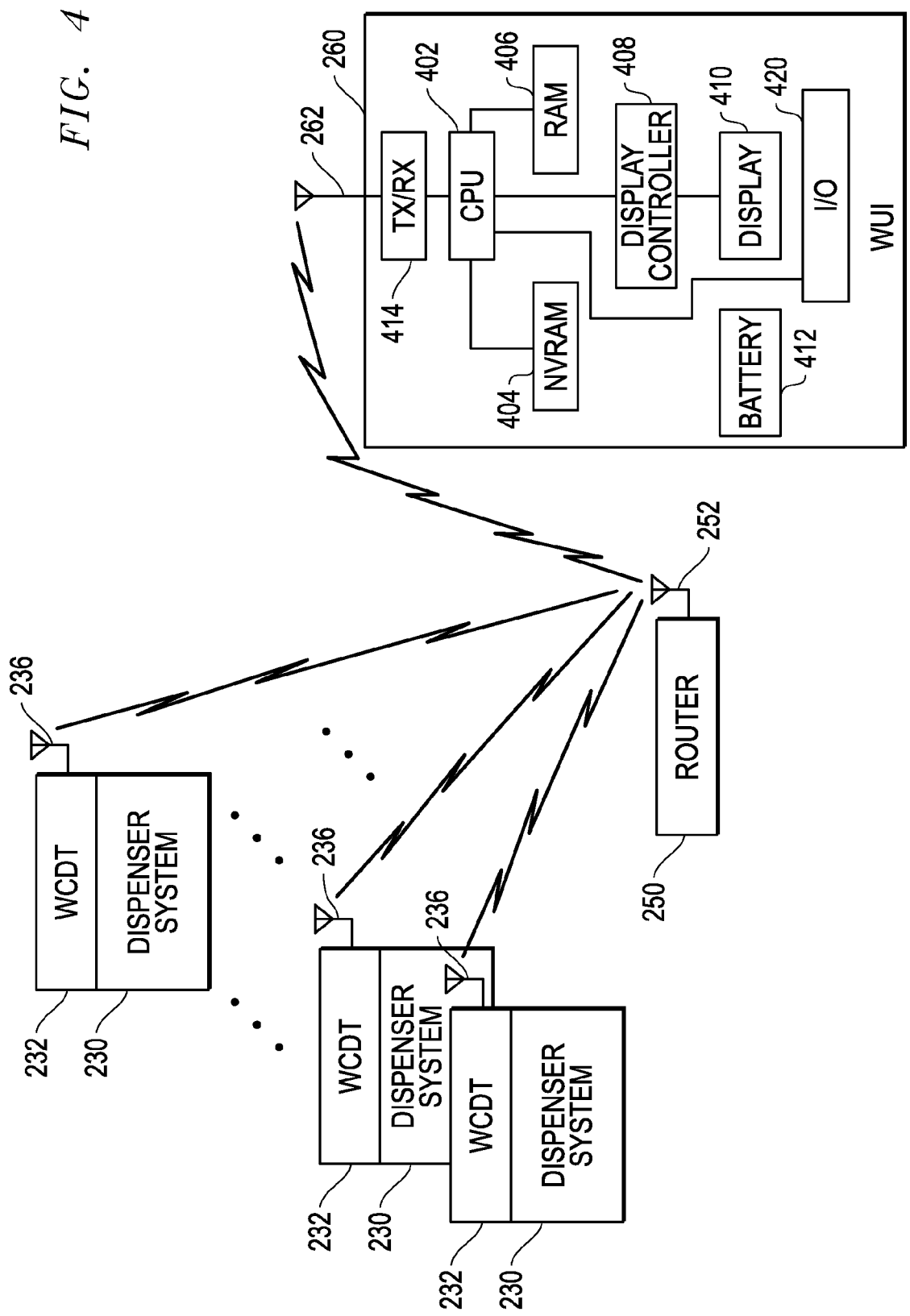

US 9,811,079 B2

SYSTEMS AND METHODS FOR WIRELESS MONITORING AND CONTROL OF COUNTERMEASURE DISPENSER TESTING SYSTEMS

FIELD OF THE INVENTION

This invention relates generally to countermeasure dispenser systems, and more particularly to countermeasure dispenser testing systems.

BACKGROUND OF THE INVENTION

Conventional aircraft countermeasure dispenser systems (CMDS) receive inputs from various threat warning systems on an aircraft and react to these inputs by dispensing munitions, such as chaff and flares, to deter anti-aircraft missile threats. An example of a conventional CMDS is the ALE-47 Countermeasures Dispenser System available from Symetrics Industries of Melbourne, Fla.; as well as predecessor or other systems to the ALE-47, such as ALE-40 and ALE-50 systems. The ALE-47 Countermeasure dispensing system is commonly used for dispensing countermeasures by the United States Air Force, Navy, Marine, Army, Coast Guard and Homeland Security aircraft and helicopters. It is also used by allied Air Forces, and commercial VIP aircraft around the world. The ALE-47 CMDS is an integrated, reprogrammable, computer controlled system that employs countermeasure dispensing routines based on commands from threat warning systems. These dispensing routines are programmed by the operating command. The ALE-47 gives the aircrew a "smart" countermeasures dispensing system that allows them to optimize the countermeasures employed against antiaircraft threats. The ALE-47 is employed on a variety of airborne military platforms, including major fighters, attack, patrol, cargo, tanker and helicopter aircraft roles.

FIG. 1A illustrates a block diagram of a conventional CMDS system that is installed on a fixed wing aircraft 110. As shown in FIG. 1A, a conventional CMDS includes multiple CMDS dispenser buckets 130 that are each configured to dispense munitions such as chaff or flares from a multi-munitions container when it is received with live munitions into the dispenser bucket 130. The dispenser buckets 130 are typically strategically installed at different external locations around the aircraft 110. The number of dispenser buckets 130 depends on both the type of aircraft and the specific role of the aircraft. For example, an average C-130H aircraft is equipped with approximately eight dispenser buckets 130 and the average P-3 Orion aircraft is equipped with approximately six dispenser buckets 130. Examples of conventional threat warning systems that may be employed to provide input to a CMDS include the APR-39 Radar Warning Receiver available from Northrup Grumman Electronic Systems of Linthicum, Md., and the AAR-47 missile warning system available from ATK Defense Electronics Systems of Clearwater Fla.

Still referring to FIG. 1A, a controller 120 is provided for controlling the programming and dispensing of munitions from each of dispensers 130. Controller 120 is a central control head that is typically located in the cockpit of the aircraft, for example on a control yoke. As shown, controller 120 is coupled by a hardwire programming data and control path 141 to a programmer unit 128, which includes a processor and memory for receiving and storing munitions firing software. Programmer unit 128 in turn is coupled to provide programming data 143 to sequencers 122 that are each coupled by a respective hardwire path to control operation of each of two respective dispenser buckets 130, as well as to controller 120. Each of sequencers 122 includes a processor configured to run software corresponding to the programming data 143 received from programmer unit 128 to control the dispenser buckets 130. In response to programming commands received across path 141 from controller 120, programmer 128 dispenses designated munitions-firing logic as software across hardware programming path 143 to each of sequencers 122, which in turn uses the designated munitions-firing logic received from programmer 128 to control the firing operation of each of its coupled dispenser buckets 130 (e.g., munitions firing sequence, munitions firing rate, number of individual munitions fired in response to each individual manual fire command entered at the controller 120, etc.) in response to commands received from the controller 120. As shown, controller 120 is coupled to communicate munitions firing commands across hardware path 140 to each of sequencers 122, each of which responds by commanding its attached dispenser buckets 130 to fire munitions from the multi-munitions containers installed in each dispenser bucket 130 during flight operations according to the designated munitions-firing software logic. Controller 120 also receives munitions identification information from each of sequencers 122 across hardware communication path 140 including number of installed unfired and unfired munitions, and type/s of currently installed munitions.

To test and maintain a CMDS, maintenance personnel must install a test box 132 into each individual dispenser bucket 130 from the exterior of the aircraft 110. Such a test box 132 is typically referred to as a countermeasures dispenser tester (CDT or CMDT), conventional examples of which include TS-4485/ALM-288 (Air Force), TS-4535/ASM-293 (Army) and S-5213/ALE (Navy) Countermeasure Dispenser Detectors available from BAE Systems of Austin, Tex. Such a conventional CDT 132 is a self-contained, battery-powered flight line tester that is used to prove aircraft readiness by performing functional checks of the CMDS that is installed on the aircraft, and replaces the AN/ALM-176 Stray Voltage Test Set, the AN/ALM-177 Dispenser Test Set, and the Flight Line Payload Simulator. Each conventional CDT 132 is contained within a chassis enclosure that replaces and simulates a multi-munitions container so that the munitions identification and firing functions of the CMDS may be tested. Each CDT 132 is equipped with connectors that interface with the munitions identification switches and firing connections of a dispenser bucket system 130 so as to allow components of the CDT 132 to communicate with a given sequencer 122 in a manner that simulates installation and firing of actual munitions of a multi-munitions container installed into dispenser bucket 130.

FIG. 1B illustrates a munitions cavity 129 of a conventional dispenser bucket system 130 from which a multi-munitions container 135 is being removed in the direction of the arrows. Also shown is a conventional CDT 132 ready for installation in place of munitions container 135. As shown, munitions container 135 includes thirty munitions compartments 190. The back wall of each of thirty munitions compartments 190 includes a pair of electrical firing contacts 192 and 194 that are provided for interfacing with corresponding electrical firing contacts on a respective individual munitions (not shown) inserted within the compartment 190, and that transmit a fire command to the individual installed munitions to cause it to ignite and deploy from its compartment 190. Sequencers 122 and/or other components of the conventional CMDS system may be configured to use electrical continuity-measurement signals transmitted through electrical firing contacts 192 and 194 and firing contacts 149 and 151 of dispenser bucket system 130 to sense whether each munitions compartment contains an unfired or fired munition, or whether each munitions compartment 190 is empty, i.e., by measuring electrical continuity across firing contacts 149 and 151, i.e., an electrically closed (e.g., shorted) pair of given firing contacts 192 and 194 indicating the presence of an unfired munition in a corresponding munitions compartment 190, and an electrically open pair of given firing contacts 192 and 194 indicating the absence or fired condition of a munition in a corresponding munitions compartment 190.

As further shown in FIG. 1B, the interior back wall of dispenser bucket 130 is a breech (contact) plate that includes thirty pairs of breech plate firing contacts 149 and corresponding breech plate spring type ground contacts 151 that are arranged and configured to mate with thirty corresponding pairs of contacts (not shown) provided on the rear surface of munitions container 135 in order to transmit fire command signals to each of fire electrical contacts 194 of dispenser bucket system 130 so as to allow hardwire munitions firing signals to be transmitted to munitions container 135 via hardwire communication path from a sequencer 122 of the CMDS. Also shown are six recessed two-position payload identification and magazine presence switches 136 (i.e., in or out spring-loaded depressable toggle switches) that are configured for respectively receiving up to six corresponding aligned payload type and presence coding posts 199 that protrude from the rear side of munitions container 135 to depress a corresponding one of the switches 136. In this regard, the type or combinations of types of munitions loaded into munitions compartments 190 of a given multi-munitions container 135 may be indicated by the pattern (i.e., number and identity) of fixed posts 199 that are selected to protrude to depress one or more switches 136 when munitions container 135 is inserted into dispenser bucket system 130 to allow munitions identification information from munitions container 135 for each of the munitions currently loaded in the compartments 190 of munitions container 135 to be provided and transmitted across a hardwire communication path to controller 120 via sequencer 122 in response to a separate signal provided to each switch 136 from sequencer 122.

FIG. 1C illustrates a conventional CDT 132 in position to be installed backside first into the cavity 129 of dispenser bucket system 130 of FIG. 1C in the direction of the arrows. As shown, backside of chassis enclosure of CDT 132 includes a breech plate adapter 191 that has thirty protruding pin-type firing contacts 161 that are arranged and configured to mate with respective breech plate firing contacts 149 of dispenser bucket system 130, and thirty corresponding ring type ground contacts 163 that are arranged and configured to mate with respective breech plate spring type ground contacts 151 of dispenser bucket system 130. When so mated, contacts of CDT 132 and dispenser bucket system 130 transmit munitions firing signals and continuity measurement signals to CDT 132 from dispenser bucket system 130 that have been received from a sequencer 122 of a CMDS. Conventional CDT 132 also includes main electronics circuitry described further below, and a battery compartment block 193 that houses four 1.5 Volt "D" size batteries which provide the CDT 132 with electrical power. A face plate 133 with a control panel is provided on the front side of conventional CDT 132 as shown in FIG. 1B. The CDT control panel 133 includes various CDT controls and an LCD display 195 as further shown in FIG. 1D.

As shown in FIGS. 1C and 1D, conventional CDT 132 is also provided with manually displaceable payload type and presence coding plunger pins 155 (labeled "A", "B", "C", "D", "E" and "F") that are configured to be used to selectably press and manipulate corresponding recessed payload identification and magazine presence switches 136 in "in" or "out" condition when CDT 132 is received within dispenser bucket 130 in order to allow a user to manually displace pins 155 to simulate a specific type/identity of munitions payload and magazine presence, which is a firing interlock condition for the CMDS system. Each of plunger pins 155 may be manually depressed and rotated to depress and hold a corresponding switch 136 in an "in" position. Sequencer 122 determines the "in" or "out" position of each given switch 136 by transmitting an individual signal to each switch 136 and sensing the response from the given switch 136. Continuity (open or short) between each pair of CDT firing contacts 160 and 161 may be controlled by manual user input to CDT control panel 133 to simulate presence or absence of unfired munitions in each of munitions compartments 190, and the resulting continuity between each pair of contacts 192 and 194 then measured by electrical continuity-measurement signals provided by sequencer 122 via dispenser bucket contacts 149 and 151. Fastening pins 197 are provided for attaching/securing CDT 132 to the breech (contact) plate of dispenser bucket system 130 in the same way multi-munitions container 135 is attached by fasteners 197 to the breech (contact) plate of dispenser bucket system 130.

Each conventional CDT 132 also includes memory and a processor that executes software and controls operation of the CDT 132, as well as a manual user interface in the form of manually activated input/output controls and a local display provided on the face plate of the CDT 132 that allow a technician to locally interact with the CDT 132 to control its modes of operation, as well as to observe and obtain diagnostic data reflecting operation of the dispenser bucket 130 to which it is attached. Selectable modes of operation for CDT 132 are built-in test "BIT" (when not installed in a dispenser bucket system 130), stray voltage "S.V." test (when installed in a dispenser bucket system 130), fire test, misfire detection and correction, jettison (i.e., all munitions fired). Diagnostic data that is collected by the test box is count, timing and numbering of valid fire pulses, limiting of dual squib fire pulses, bad ground or contact spring, no fire positions. FIG. 1D illustrates manual user interface feature of the face plate 133 of a conventional CDT 132.

A typical CDT unit 132 performs a number of different functions to test operation of a countermeasure dispenser bucket into which it is installed. For example, a typical CDT 132 tests the following modes of operation for a countermeasure dispenser bucket 130: stray voltage test, built in test (i.e., stand-alone built in test routine that may be initiated to test CDT 132 operation and display when CDT 132 either installed or not installed in a CMDS dispenser bucket 130), munitions fire test, munitions jettison test, munitions count, and misfire detection. A typical CDT 132 collects the following data for diagnosis of a countermeasure dispenser bucket: count of valid fire pulses, limiter of dual squib fire pulses, bad ground of contact spring, no fire positions, and sequence of fired positions. A maintenance technician controls testing of each of the countermeasure dispenser buckets installed on an aircraft by entering operational commands for each dispenser bucket into the controller 120.

Functionality checks of a conventional CMDS using CDTs must be manually controlled and monitored throughout the test, and conducting a CMDS functional check requires the mode or settings on each individual CDT to be manually changed throughout the duration of the test. In order to change the operational mode or function of conventional CDTs (e.g., such as changing from a stray voltage check to a fire test for each dispenser bucket), or to review the data collected by each given CDT for its respective dispenser bucket (e.g., such as the fire count data), a maintenance technician must exit the aircraft, and walk around the airplane to each individual CDT to collect test data and/or to physically change the test mode settings at each CDT every time a different type of test is to be performed on each dispenser bucket system. In a typical case involving an aircraft with multiple countermeasure dispenser buckets (e.g., six, eight, or more dispenser buckets) that is to be tested in multiple modes (e.g., such as flare, chaff, and/or customized O1 and O2 settings of the ALE-47 system that can be used for other types of munitions or a monition mixes) a technician must travel back and forth between the interior to the exterior of the aircraft multiple times, which requires a significant amount of time and effort. The constant travel back and forth between each individual CDTs and the flight deck to change switch settings and check results makes testing a CMDS such as an AN/ALE-47 system a tedious and long process. Accordingly, two to three experienced technicians are normally employed to test the multiple dispenser buckets of a countermeasure dispenser system using multiple CDTs that are each installed into a respective countermeasure dispenser bucket. This allows one technician to stay in the cockpit of the aircraft monitoring and manipulating the countermeasure system control head while one or two other technicians travel around the aircraft to each CDT to physically change the different CDT testing modes and to record the data collected from each CDT for each and every test.

Using a two technician crew, such a process normally takes approximately three hours to complete a full CMDS functional check for a given aircraft having eight dispenser buckets, such as a C130H. This translates to six man-hours per aircraft to perform a functional check, which is then multiplied by the number of individual aircraft having CMDS to be tested. The total time and effort required to maintain and achieve CMDS system operability for a number of aircraft is further increased by the number of aircraft requiring CMDS operational checkout prior to loading magazines or troubleshooting, resulting in a substantial number of man-hours and effort required to maintain the ALE-47 systems for a number of aircraft. This time and effort is especially significant during wartime scenarios where CDTs are used before loading chaff or flares into magazines of a CMDS before each and every mission flight, potentially resulting in a six-man hour CMDS operation check prior to each flight.

SUMMARY OF THE INVENTION

Disclosed herein are systems and methods for wireless monitoring and control of wireless countermeasure dispenser testing system units (WCDTs). The disclosed systems and methods may be advantageously implemented in one embodiment to allow functions of multiple WCDT units to be simultaneously monitored and controlled in real time via a wireless connection or wireless network connection such as wireless local area network (WLAN) or other short or long range wireless network. In one embodiment, the disclosed systems and methods may be implemented using Wi-Fi protocol such as IEEE 802.11-based protocol, e.g. one or more of IEEE 802.11a/b/g/n protocols. However, any other radio frequency (RF) or other wireless communication medium or technique suitable for communicating data and/or control signals between a wireless user interface system and one or more WCDTs may be employed including, but not limited to, LTE, WiMAX, etc. In any case, such wireless communication may occur directly between a wireless user interface (WUI) system (e.g., portable wireless device such as tablet computer, smart phone, notebook computer, etc.) and each given WCDT, or may be routed between a wireless user interface system and each WCDT through one or more optional intermediary wireless devices, such as wireless repeater, wireless router or other type of wireless access point (e.g., COTS wireless router/s and/or access point/s), etc.

In one embodiment, the disclosed WCDTs may be employed to achieve a significant reduction in the amount of time and effort required for maintaining a CMDS (e.g., such as an ALE-47 Countermeasures Dispenser System) by allowing a single technician to wirelessly and simultaneously monitor and control multiple WCDTs installed on an aircraft during CMDS system testing, e.g., via a wireless user interface system such as a wireless compatible tablet computer or other wireless-capable host computing device. For example, a single technician may wirelessly monitor and control multiple CDTs from the flight deck of the aircraft during CMDS testing operations, and without requiring the technician to leave the flight deck during the testing operations. This saves time and reduces the effort required to test a CMDS system relative to CMDS testing operations using conventional (non-wireless) CDTs, e.g., reducing the test effort for a CMDS having eight dispenser systems (e.g., dispenser buckets) from a two man, six man-hour job for conventional CDTs to a one man, one hour job for wireless-capable WCDTs. In addition, the wireless capability of the disclosed WCDT systems may be implemented to achieve additional capabilities not possible with conventional (non-wireless) CDTs, such as simulated test scenarios in which a single human technician can monitor the fire counts on all WCDTs, and reset and change modes in real time from the aircraft flight deck without ever having to get out of his or her seat. Moreover, since wireless communications are employed for WCDT monitoring and control, the above-described advantages may be achieved without the use or existence of data cables that route control signals and data between individual WCDTs and the user interface system.

In one exemplary embodiment, a wireless user interface system may be provided with user interface logic (e.g., such as firmware, software, etc.) that is executed by at least one processing device of the user interface system to receive user input (e.g., via a graphical user interface "GUI") and to generate wireless control signals (e.g., wireless test control signals that select the number and/or type of munitions to be simulated by each WCDT and/or that control interaction with and testing of other operating features of a countermeasures dispenser within which the WDCT is installed) for transmission to each WCDT based on the user input. User interface logic of the wireless user interface system may also be configured to monitor operation of each given WCDT, e.g., based on wireless monitoring signals received from the given WCDT (e.g., monitoring signals that indicate one or more tested operational characteristics of a dispenser system such as dispenser system fire count in response to a fire command from a CMDS controller).

In another exemplary embodiment, the disclosed systems and methods may be implemented to provide a wireless hardware module as an adapter system that is configured to modify an existing conventional (non-wireless) CDT (e.g., such as an existing TS4488/ALM-288 countermeasures dispenser tester) to enable wireless monitoring and control of the modified CDT. Such a wireless hardware adapter system may be provided in any configuration suitable for converting a conventional CDT to a WCDT, but in one exemplary embodiment may be configured to accomplish modification of a conventional CDT to a WCDT by replacing the faceplate of a conventional CDT with the wireless hardware adapter system. In such an embodiment, the wireless hardware adapter system may be dimensionally configured to be mounted to a chassis of the conventional CDT in place of the face plate and/or other components of the CDT, and may be operationally configured to provide one or more mechanical and/or electrical interfaces to the existing monitoring and control interface components within the chassis of the conventional CDT. While conversion to a CDT may be performed on a conventional CDT while it is installed on an aircraft, it is also possible that conventional CDTs may be converted to WCDTs remotely from an aircraft installation, i.e., a conventional CDT may be removed from an existing aircraft installation, and transported to a remote location (e.g., such as a hangar, shop, etc.) where the conventional CDT faceplate and/or other components may be removed from the CDT chassis and replaced with a wireless hardware adapter system to complete the conversion to a WCDT before the WCDT is transported back to the aircraft and reinstalled. In a further embodiment, such a wireless hardware adapter system may be provide in the form of a test kit that includes components (e.g., such as new face plate, electro-mechanical actuators for existing plunger pins or new plunger pins with actuators, wireless transceiver circuitry, optional new processor and/or memory, etc.) as may be required for conversion of a particular configuration of conventional CDT to a particular desired WCDT configuration. Alternatively, complete wireless CMDS testing systems (e.g., including one or more complete WCDT units, wireless router, wireless user interface system such as user interface laptop or tablet, testing system software or firmware, etc.) may be provided.

In one respect, disclosed herein is a system for wireless testing of a countermeasure dispenser system (CMDS), including at least one wireless countermeasure dispenser testing (WCDT) system including wireless communication circuitry and being configured to be received in a munitions cavity of a countermeasure dispenser of the CMDS to at least one of gather diagnostic data regarding operation of the countermeasure dispenser and wirelessly transmit the gathered diagnostic data, test one or more operating features of the countermeasure dispenser, or a combination thereof. The system may also include at least one wireless user interface (WUI) system having wireless communication circuitry, the WUI system being configured to at least one of: transmit wireless test control signals to control operation of the WCDT system to test one or more operating features of the countermeasure dispenser, receive wireless-transmitted gathered diagnostic data from the WCDT system and at least one of display, store or wirelessly retransmit information that is based on the gathered diagnostic data, or a combination thereof.

In another respect, disclosed herein is a method for wireless testing of a countermeasure dispenser system (CMDS) that includes at least one countermeasure dispenser and a controller coupled to the countermeasure dispenser for monitoring and controlling the programming and dispensing of munitions from the countermeasure dispensers. The method may include providing at least one wireless countermeasure dispenser testing (WCDT) system including wireless communication circuitry in a munitions cavity of a countermeasure dispenser of the CMDS; and providing at least one wireless user interface (WUI) system including wireless communication circuitry. The method may also include at least one of the following steps: using the WCDT system to gather diagnostic data regarding operation of the countermeasure dispenser and wirelessly transmit the gathered diagnostic data from the WCDT system to the WUI system, and using the WUI system to receive the wireless-transmitted gathered diagnostic data from the WCDT system and to at least one of display, store or wirelessly retransmit information that is based on the gathered diagnostic data; or using the WUI system to transmit wireless test control signals from the WUI system to the WCDT system, and using the WCDT to receive the wireless test control signals and to respond to the received wireless test control signals by testing one or more operating features of the countermeasure dispenser based upon the received wireless test control signals, or a combination thereof.

In another respect, disclosed herein is a wireless countermeasure dispenser testing (WCDT) system configured to be received in a munitions cavity of a countermeasure dispenser of a countermeasure dispenser system (CMDS), the WCDT system including system circuitry configured to at least one of gather diagnostic data regarding operation of the countermeasure dispenser and wirelessly transmit the gathered diagnostic data, receive and respond to wireless test control signals by controlling operation of the WCDT system to test one or more operating features of the countermeasure dispenser, or a combination thereof.

BRIEF DESCRIPTION OF THE DRAWINGS

FIG. 1C illustrates a conventional countermeasures dispenser tester and conventional dispenser system.

FIG. 4 illustrates a block diagram of wireless components of a countermeasure dispenser system configured in wireless testing mode according to one exemplary embodiment of the disclosed systems and methods.

DESCRIPTION OF ILLUSTRATIVE EMBODIMENTS

Figure 2:
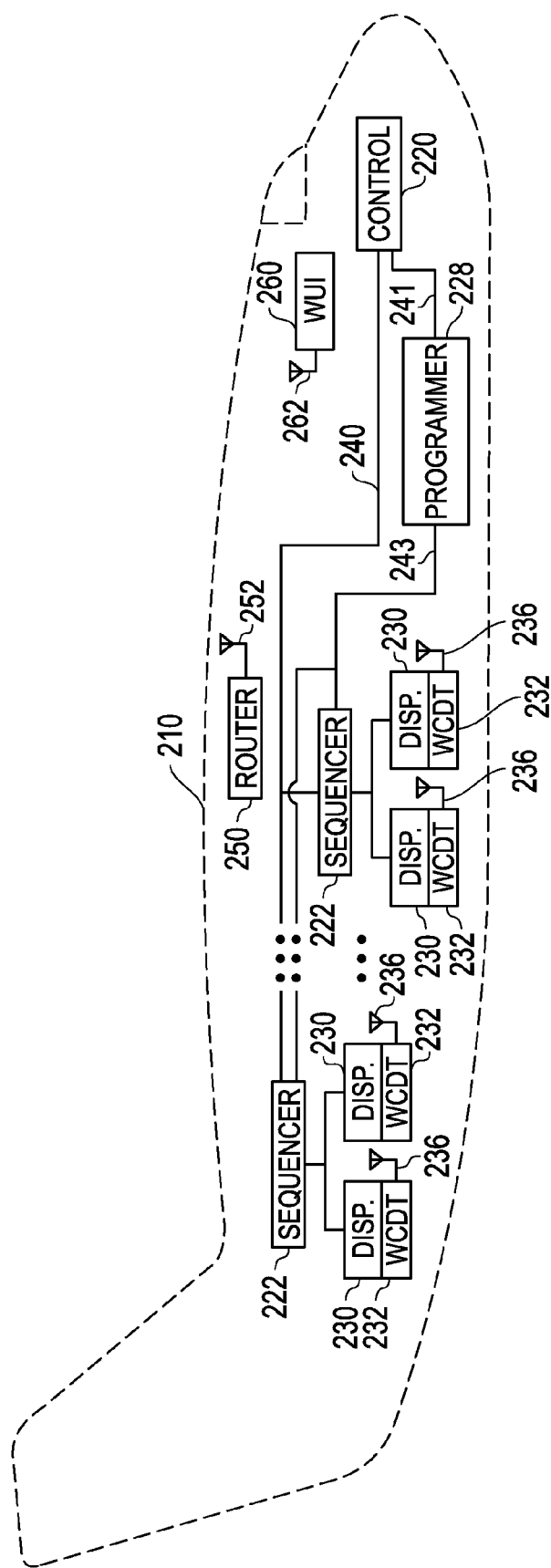
FIG. 2 illustrates a block diagram of a countermeasure dispenser system installed on a fixed wing aircraft according to one exemplary embodiment of the disclosed systems and methods.

FIG. 2 illustrates one exemplary embodiment of CMDS system with wireless CMDS testing system components as they may be installed together on a fixed wing aircraft 210. It will be understood that the disclosed systems and methods may be implemented with CDMS systems installed on a variety of types of fixed wing aircraft including, but not limited to, fighters, attack aircraft, patrol aircraft, cargo or tanker aircraft, commercial airliners, VIP or head of state aircraft as well as on other types of aircraft, e.g., including rotary aircraft such as helicopters. The disclosed systems and methods may alternatively implemented with CDMS systems installed on other types of vehicles, such as ocean going ships and other vessels, unmanned aerial vehicles (UAVs), etc.

Figure 3A:
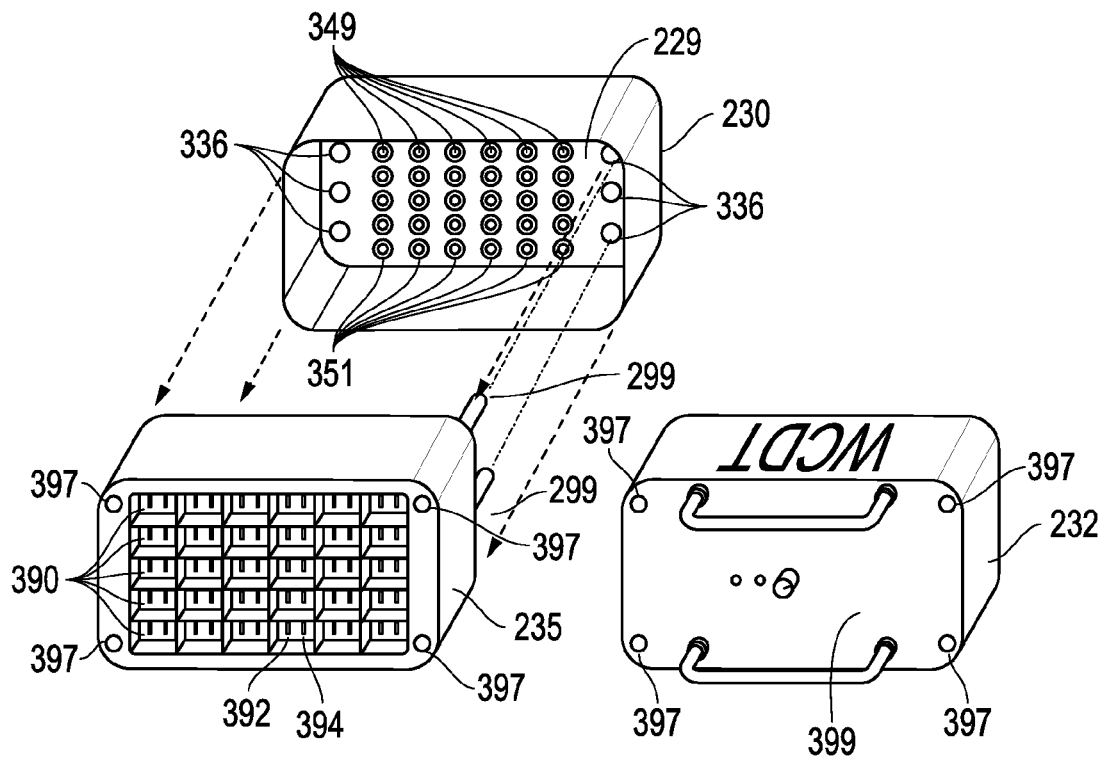
FIG. 3A illustrates a dispenser system, multi-munitions container, and countermeasure dispenser testing system according to one exemplary embodiment of the disclosed systems and methods.
Figure 3B:
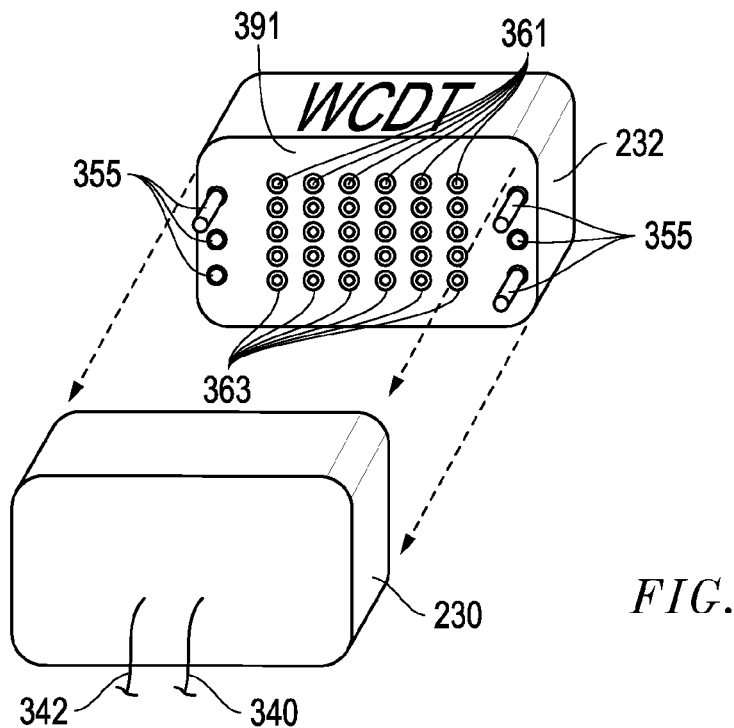
FIG. 3B illustrates a dispenser system and wireless countermeasure dispenser testing system and according to one exemplary embodiment of the disclosed systems and methods.

As shown in FIG. 2 and further in FIGS. 3A-3B, the CMDS includes multiple CMDS dispensers (e.g., dispenser buckets or containers) 230 that face outward from the aircraft, and that are each configured to dispense munitions such as chaff or flares from a multi-munitions container 235 (see FIG. 3C) when it is provided with live munitions into the given dispenser bucket 230. The dispenser buckets 230 may be strategically installed at different external locations around the aircraft 210 (on one or more sides of the aircraft), with the number of dispenser buckets 230 depending on both the type of aircraft and the specific role of the aircraft. In the illustrated embodiment four dispenser buckets 230 are illustrated, although it will be understood that the number of installed dispenser buckets may be greater or less than four. For example, an average C-130H aircraft may be equipped with approximately eight dispenser buckets 130 and the average P-3 Orion aircraft may be equipped with approximately six dispenser buckets 130. Examples of conventional threat warning systems that may be employed to provide input to the CMDS of FIG. 2 include the APR-39 Radar Warning Receiver available from Northrup Grumman Electronic Systems of Linthicum, Md., and the AAR-47 missile warning system available from ATK Defense Electronics Systems of Clearwater Fla.

Still referring to FIG. 2, a controller 220 may be provided as shown for controlling the programming and dispensing of munitions from each of dispensers 230 during flight. Controller 220 may include a central control head that is located in the cockpit or flight deck of the aircraft, for example on a control yoke. As shown, controller 220 may be coupled by a hardwire programming data and control path 241 to a programmer unit 228, which may include at least one processing device and memory for storing munitions firing software. Programmer unit 228 in turn may be coupled as shown to provide programming data 243 to multiple sequencers 222 that may be each coupled by a respective hardwire path to control operation of each of two respective dispenser buckets 230, as well as to controller 220. Programmer unit 228 may be located anywhere on the aircraft 210, e.g., such as side shelf where it is accessible to a user for loading logic (e.g., software and/or firmware) into the programmer unit 228.

Controller 220 may include at least one processing device configured to execute munitions-dispensing logic received from programmer unit 228, e.g., to determine when to dispense munitions and what type of munitions to dispense based on a detected threat such as an incoming missile, detected laser indicator, detected radar emission, etc. Each of sequencers 222 may include at least one processing device configured to execute logic corresponding to the programming data 243 received from programmer unit 228 to control operation of the dispenser buckets 230. In response to programming commands received across path 241 from controller 220, programmer 228 may dispense designated munitions-firing logic as software across hardware programming path 243 to each of sequencers 222, which in turn uses the designated munitions-firing logic received from programmer 228 to control the firing operation of each of its coupled dispenser buckets 230 (e.g., munitions firing sequence, munitions firing rate, number of individual munitions fired in response to each individual manual fire command entered at the controller 220, etc.) in response to commands received from the controller 120.

As further shown in FIG. 2, controller 220 may be coupled to communicate munitions firing commands across hardware path 240 to each of sequencers 222, each of which responds with firing signal/s 340 (see FIG. 3C) to its attached dispenser buckets 230 to fire munitions from the multi-munitions containers 235 (see FIG. 3A) that may be installed with live munitions into each dispenser bucket 230 during flight operations according to the designated munitions-firing software logic. Controller 220 may also receive munitions identification information from each of sequencers 222 across hardware communication path 240 including number of installed unfired and fired munitions, and type/s of currently installed munitions. In this regard, each dispenser bucket 230 may be provided with munitions identification switches and firing connections that are arranged and configured to mate with corresponding identification and firing connectors of a single or multi-munitions container 235 that is capable of holding one or more live munitions such as flares or chaff.

As described elsewhere herein, each munitions container 235 may be capable of receiving firing command signals from a mated dispenser bucket 230 as described elsewhere herein. Identity (type, size, etc.) of munitions that are currently received within the munitions compartments 390 of a munitions container 235 may also be indicated by particular pattern of extended coding posts 299 that extend from the rear side of a given munitions container 235. Further, condition (e.g., fired, unfired, defective, etc.) of each munition that is currently received within each given munitions compartment 390 of a munitions container 235 may be determined by sequencer 222 and/or controller 220 by measuring the continuity of an electrical signal that is provided from dispenser bucket 230 across electrical firing contacts 392 and 394 of each munitions compartment 390, e.g., an electrically closed (e.g., shorted) pair of given firing contacts 392 and 394 indicating the presence of an unfired munition in a corresponding munitions compartment 390, and an electrically open pair of given firing contacts 392 and 394 indicating the absence or fired condition of a munition in a corresponding munitions compartment 390.

In the exemplary embodiment of FIG. 2, each dispenser system 230 of the illustrated CMDS is shown provided with a wireless countermeasure dispenser testing system unit (WCDT) 232, the components of which are contained within a chassis enclosure (e.g., metal box) that is received in operative relationship within the munitions cavity 229 of the dispenser bucket 230. Also shown is a wireless user interface system (WUI) 260 (e.g., portable wireless device such as tablet computer, smart phone, notebook computer, etc.) that is provided to wirelessly monitor and control CMDS testing in a manner as described further herein. In one exemplary embodiment, each dispenser system 230 may be a conventional dispenser system such as the dispenser systems 130 of FIG. 1A, although it is alternatively possible that the disclosed wireless monitoring and control of CMDS testing may be performed using a WCDT 232 provided in operative relationship with a dispenser system of non-conventional configuration.

Figure 1A:
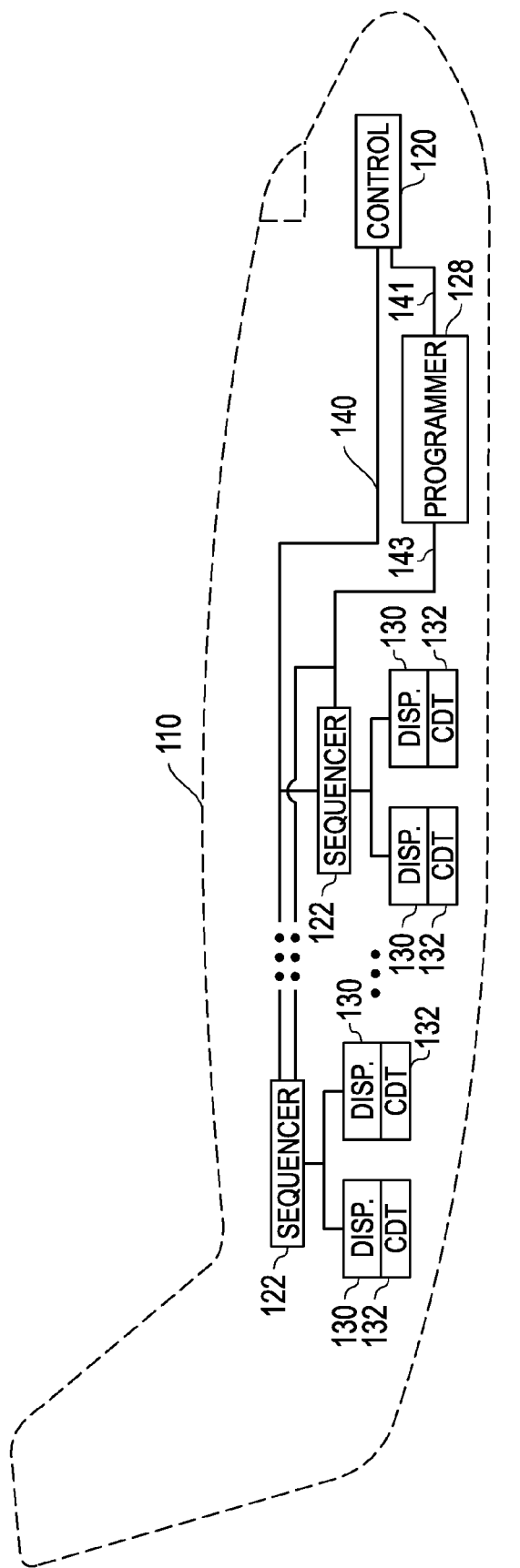
FIG. 1A illustrates a block diagram of a conventional countermeasure dispenser system installed on a fixed wing aircraft.
Figure 1B:
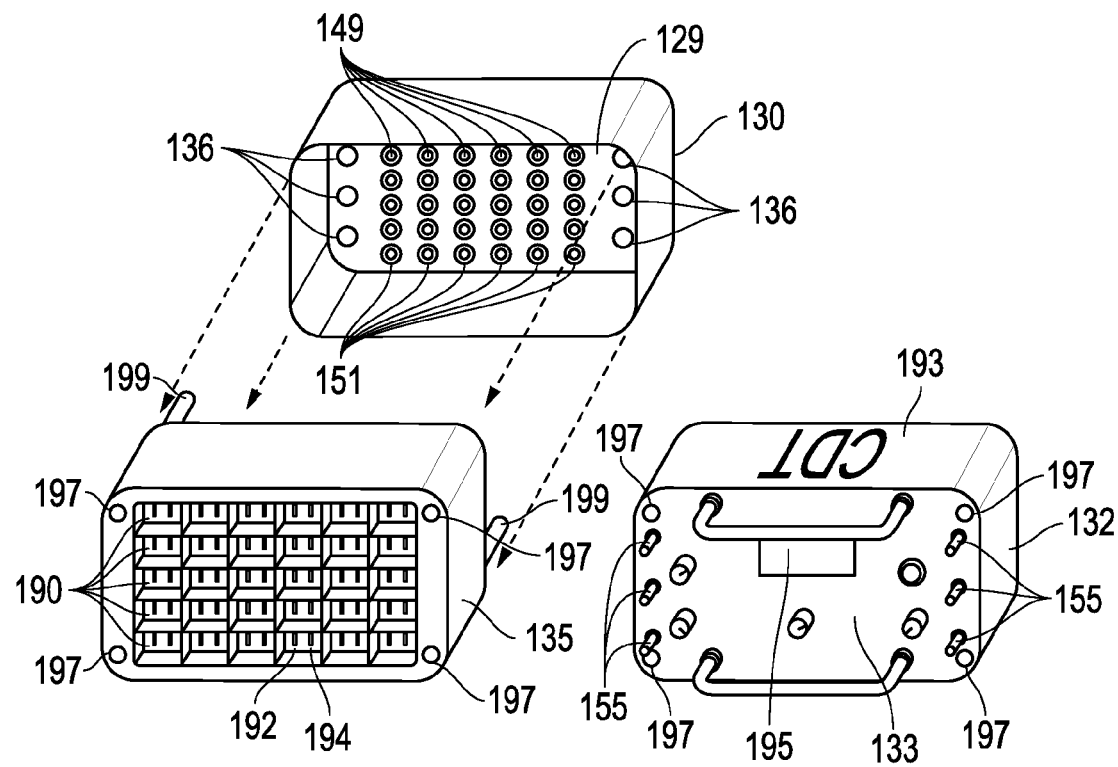
FIG. 1B illustrates a simplified perspective view of a conventional dispenser system, conventional multi-munitions container, and conventional countermeasures dispenser tester.
Figure 1C:
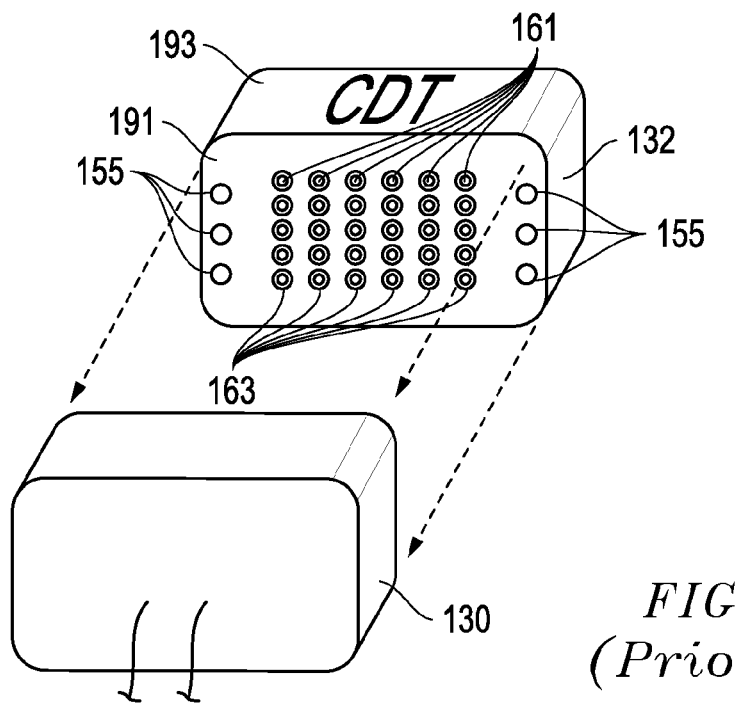
FIG. 1C illustrates

Thus, although numbered differently in FIGS. 2-4, it will be understood that one or more components of a CMDS system (except for WCDTs 232 and WUI 260 of this disclosure) may in one exemplary embodiment be conventional CMDS components such as described in relation to FIGS. 1A-1C, such that no permanently installed hardware components of a conventional CMDS system (such as illustrated in FIG. 1A) need be replaced. Rather, to allow the disclosed systems and methods to be advantageously implemented with a conventional CMDS system such as illustrated in FIG. 1A only requires that one or more WCDTs 232 be installed within respective conventional dispenser systems 130 in place of the conventional CDTs 132, and that at least one WUI 260 be provided within wireless communication range (e.g., direct wireless connection or connection through an intermediary wireless device/s) of the installed WCDTs 232 to wirelessly monitor and control CMDS testing. In one exemplary embodiment, a WCDT 232 may be configured with a combination of electro-mechanical actuated interface connectors and electronic signal interface connectors that are suitable for mating with corresponding electrical contacts and switches of a conventional dispenser system 130 in order to wirelessly provide at least some or all of the control and monitoring functions that are provided by the manual user interface 133 of a conventional CDT 132.

FIG. 3A illustrates a munitions cavity 229 of a dispenser (bucket) system 230 from which a multi-munitions container 235 is being removed in the direction of the arrows. Also shown is a WCDT 232 ready for installation in place of munitions container 235. In FIG. 3A, dispenser system 230 and munitions container 235 are illustrated as having the same dimensional and interface configuration as employed with a conventional dispenser system 130 of FIG. 1, although it will be understood that a dispenser system 230 and corresponding munitions container 235 may be alternatively configured with any alternative dimensional and/or interface configuration that is suitable manner for operationally interfacing to dispense munitions as part of a CMDS.

As shown in FIG. 3A, munitions container 235 includes thirty munitions compartments 390 that each are configured to receive an individual munitions (e.g., flare or chaff munitions), although a munitions container may be configured to receive more than 30 or fewer than 30 munitions, including as few as a single munitions. The back wall of each of thirty munitions compartments 390 includes a pair of electrical firing contacts 392 and 394 that are provided for interfacing with corresponding electrical firing contacts on a respective individual munitions (not shown) inserted within the compartment 390, and that transmit a fire command to the individual installed munitions to cause it to ignite and deploy from its compartment 390. Sequencers 222 and/or other components of the conventional CMDS system may be configured in one embodiment to use presence or absence of electrical signals through electrical firing contacts 392 and 394 and mating firing contacts 349 and 351 of dispenser bucket system 130 to sense whether each munitions compartment contains an unfired or fired munitions, or whether each munitions compartment 390 is empty.

As further shown in FIG. 3A, the interior back wall of dispenser bucket 230 is a breech (contact) plate that includes thirty pairs of breech plate firing contacts 349 and corresponding breech plate spring type ground contacts 351 that are arranged and configured to mate with thirty corresponding pairs of contacts (not shown) provided on the rear surface of munitions container 235 in order to transmit fire command signals to each of fire electrical contacts 394 of dispenser bucket system 230 so as to allow hardwire munitions firing signals to be transmitted to munitions container 235 via hardwire communication path from a sequencer 222 of the CMDS. Also shown are six recessed multi-position (e.g., two-position) payload identification and magazine presence switches 336 (i.e., spring-loaded depressable on/off switches) that are configured for respectively receiving up to six correspondingly aligned payload type and presence coding posts 299 that may be selected to protrude from the rear side of munitions container 235 so as to depress a corresponding one of the on/off switches 336. In this regard, the type or combinations of types of munitions loaded into munitions compartments 390 of a given multi-munitions container 235 may be indicated by the pattern (i.e., number and identity) of posts 299 that are selected to protrude to depress one or more switches 336 when munitions container 235 is inserted into dispenser bucket system 230 to allow munitions identification information from munitions container 335 for each of the munitions currently loaded in the compartments 390 of munitions container 335 to be provided and transmitted across a hardwire communication path to controller 220 from sequencer 222 in response to individual signals provided from sequencer 222 to each respective switch 336 to allow sequencer 222 to sense the position of each switch 336, e.g., by sensing open or closed switch position of each switch 336.

Figure 1D:
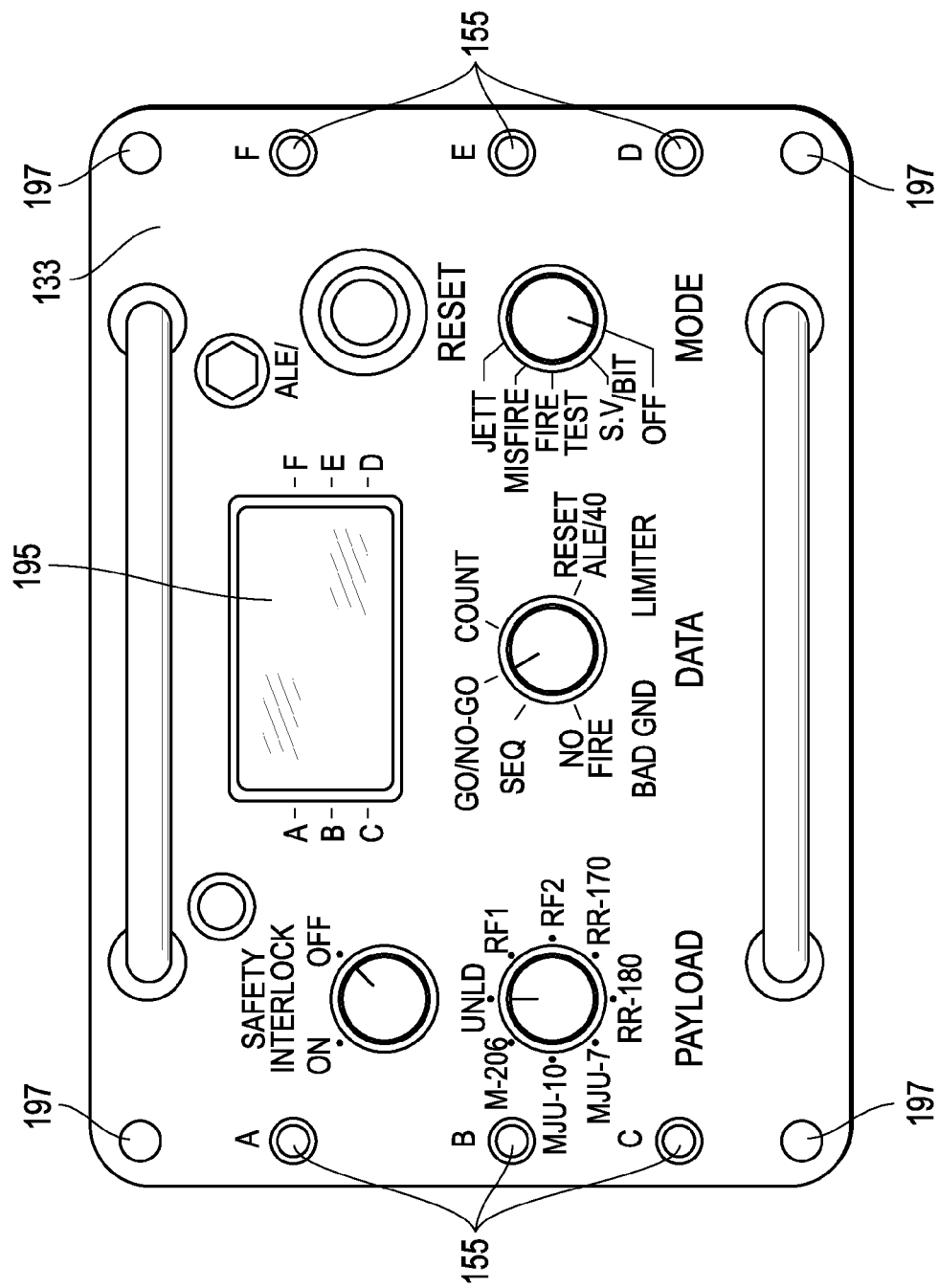
FIG. 1D illustrates a conventional manual user interface of a conventional countermeasures dispenser tester.

FIG. 3B illustrates a WCDT 232 in position to be installed backside first into the cavity 229 of dispenser system 230 of FIG. 3A in the direction of the arrows. As shown, backside of the chassis enclosure of WCDT 232 includes a breech plate adapter 391 that has thirty protruding pin-type contacts 361 that are arranged and configured to mate with respective breech plate firing contacts 349 of dispenser bucket system 230, and thirty corresponding ring type ground contacts 363 that are arranged and configured to mate with respective breech plate spring type ground contacts 351 of dispenser bucket system 230. When so mated, contacts of WCDT 232 and dispenser bucket system 230 transmit munitions firing signals to WCDT 232 from dispenser bucket system 230 that have been received from a sequencer 222 of a CMDS. It will be understood that the opposing (front) side of a WCDT 232 may be a blank (flat) face plate 399 having no controls or display, or may be of any other suitable configuration from having a simple status light (LED) to having one or more local manual controls and display. It is also possible in one exemplary embodiment that a WCDT 232 may alternatively be provided with all the input/output, plunger and display features of a full manual CDT user interface such as illustrated in FIG. 1D, in addition to the wireless components illustrated and described in relation to FIGS. 3A, 3B, 3C and 4.

As shown in FIG. 3B, WCDT 232 is also provided with automated displaceable payload type and presence coding plunger pins 355 (e.g., corresponding in geometry to manually displaceable plunger pins 155 of a conventional CDT 132) that are configured to be used to selectably press and manipulate corresponding recessed payload identification and magazine presence switches 336 in "in" or "out" condition when WCDT 232 is received within dispenser bucket 230 in order to allow a user to remotely simulate a specific type/identity of munitions payload and magazine presence by virtue of the number and identity of pressed switches 336. In this regard, each of plunger pins 355 may be selectably and linearly extended from breech plate adapter 391 and/or linearly retracted into breech plate 391 according to commands entered by a remote user into WUI 260 and transmitted wirelessly to WCDT 232. It will be understood that in an alternative embodiment, automated plunger pins may also be configured to be manually displaceable (e.g., by extension outward from face plate 399) so as to also allow a local technician to manually change the plunger pin configuration without access to the WUI 260. As further shown in FIG. 3B, fastening pins 397 may be provided for attaching/securing WCDT 232 to the breech (contact) plate of dispenser bucket system 230 in the same way multi-munitions container 335 is attached by fasteners 397 to the breech (contact) plate of dispenser bucket system 230.

Figure 3C:
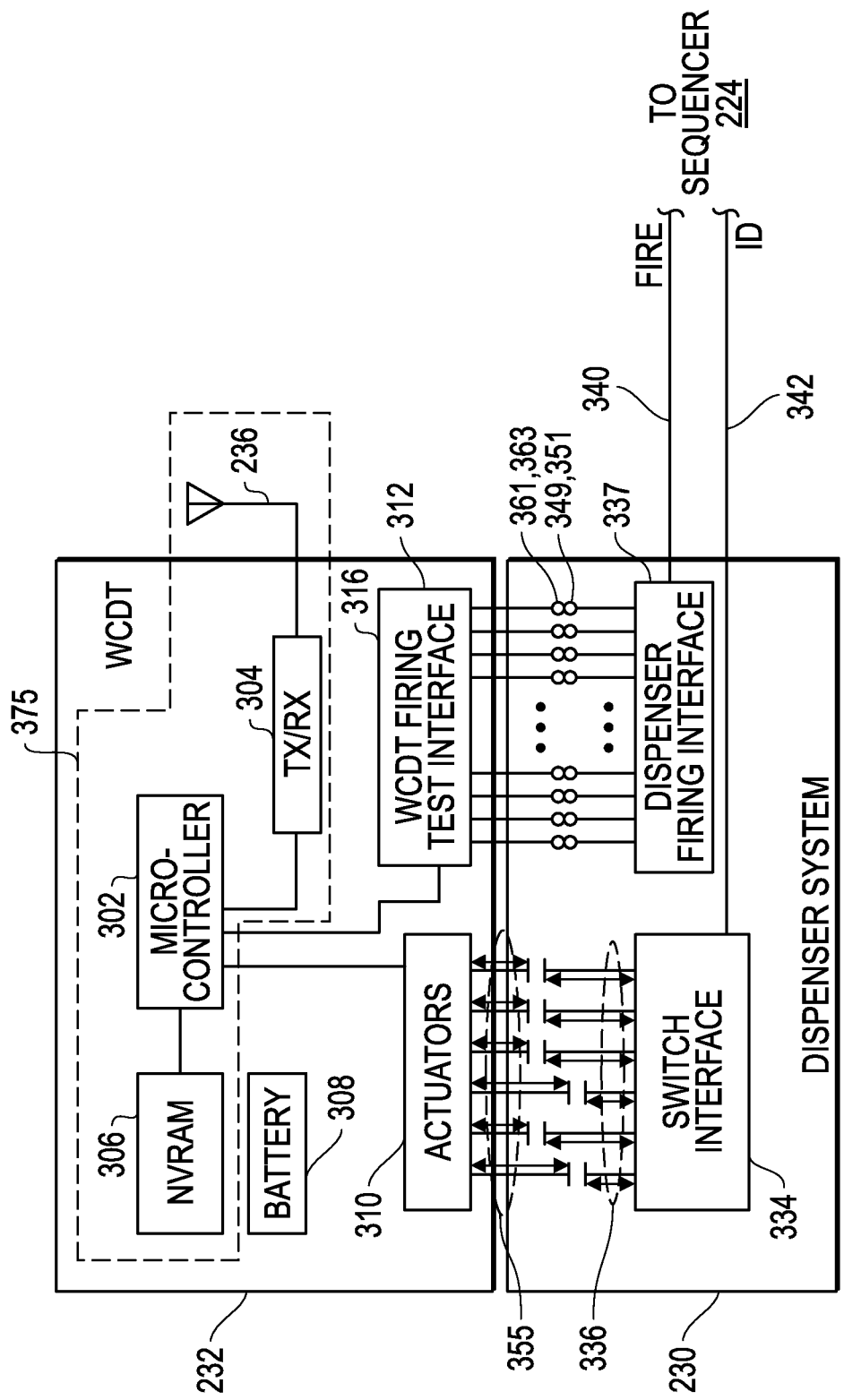
FIG. 3C illustrates a block diagram of a dispenser system and wireless countermeasure dispenser testing system according to one exemplary embodiment of the disclosed systems and methods.

FIG. 3C illustrates one exemplary embodiment of a block diagram of the operative relationship between components of a dispenser system 230 and components of a WCDT 232 when the WCDT 232 is installed within a cavity 229 of the dispenser system 230. As shown in FIG. 3C, dispenser system 230 includes munitions interface 334 that is coupled to receive munitions firing signals 340 and to provide munitions identification information 342 to a corresponding one of sequencers 222 of the CMDS in a manner as described elsewhere herein. As shown, six automated and individually displaceable payload type and presence coding plunger pins 355 are configured to align and mate with six respective corresponding two-position payload identification and magazine presence switches 336 of munitions interface 334 when WCDT 232 is fully inserted within dispenser bucket 230. When so installed, WCDT 232 replaces and simulates a multi-munitions container 235 so that the munitions identification and firing functions of the CMDS may be tested and monitored in a wireless manner using WUI 260. In this regard, the automated plunger pins 355 of WCDT 232 are configured to mate with and manipulate (e.g., depress and release) switches 336 of dispenser system 230 so as to allow components of WCDT 232 to communicate with a given sequencer 222 via settings ("in" or "out") of switches 336 in a manner that simulates installation of actual munitions of selected type and number of a multi-munitions container 235 installed into dispenser bucket 230. In this regard, the simulated type and number of munitions may be encoded based on the number and pattern of plunger pins 355 that have been selectively extended by a remote user via actuators 310 to depress corresponding switches 336 and this switch setting information communicated to a sequencer 222. Sequencer 222 may determine the "in" or "out" position of each given switch 336 at any given time by transmitting an individual signal to each switch 336 and sensing the resulting response from the given switch 336 which will vary depending on "in" or "out" position of the given switch 336, e.g., such as determined open or closed condition of each switch 336 that is controlled by the "in" or "out" position of the switch 336. Sequencer 222 may determine simulated type and number of munitions based on the determined number and pattern of extended plunger pins 355, and provide this as part of the munitions identification information information communicated to controller 222.

As further illustrated in FIG. 3C, firing test interface circuitry 312 of WCDT 232 includes multiple pairs of pin-type contacts 361 and ring type ground contacts 363 that are arranged and configured to mate with multiple respective corresponding breech plate firing contacts 349 and spring type ground contacts 351 of dispenser bucket system 230 that are in turn each coupled to munitions interface 337. When so mated, contacts of WCDT 232 and dispenser bucket system 230 may transmit munitions firing signals and electrical-continuity measurement signals to WCDT 232 from dispenser bucket system 230 that have been received from a sequencer 222. Thus, components of WCDT 232 may be advantageously configured to allow a technician to wirelessly and remotely perform similar types of testing and diagnostic data collection that must ordinarily be manually and performed locally by a technician using faceplate-mounted controls and display of a conventional countermeasures dispenser tester such as TS-4485/ALM-288, TS-4535/ASM-293 and S-5213/ALE.

Still referring to FIG. 3C, WCDT 232 of this exemplary embodiment is a self-contained unit having a battery or battery pack 308 that is configured for powering components of WCDT 232, although a WCDT 232 may alternatively operate on external power in another embodiment. WCDT 232 includes wireless communication and processing circuitry 375 that in this exemplary embodiment includes a processing device 302 (e.g., micro-controller or other suitable processing device) that is coupled to non-volatile memory (NVRAM) 306 which may be provided for maintaining programming (software and/or firmware) that is retrieved and executed by micro-controller 302 for purposes of controlling operation of WCDT 232 and monitoring and conducting CMDS testing operations on dispenser system 230. During such testing operations, no local interaction with WCDT 232 is required and, in one exemplary embodiment, no local input/output controls or display may be present on a faceplate or other surface of WCDT 232. Rather, all input/output data to and from WCDT 232 may be communicated wirelessly via transceiver 304 and antenna 236 of wireless communication and processing circuitry 375 to and from a WUI 260 that may itself be positioned in a physically remote location, such as aircraft cockpit or a hangar, office, etc. However, it is possible that a WCDT 232 may be optionally provided with one or more local user interface features, such as manual controls, display, indicator and/or status lights, etc. in addition to being provided with the illustrated wireless communication capability.

A technician may wirelessly interact with WCDT 232 to remotely control modes of operation of WCDT 232 as well as to observe and obtain diagnostic data reflecting operation of the dispenser bucket 230 to which it is attached, e.g., via a GUI provided on a display (e.g., liquid crystal display (LCD), LED, CRT or other suitable type of user display) of WUI device 260. Such diagnostic data may be additionally or alternatively stored in internal memory (e.g., NVRAM 306) or external memory coupled to WUI device 260 for later retrieval and analysis. Additionally or alternatively, WUI device 260 may be configured to retransmit such diagnostic data to, and/or receive control signals from, another wireless device that may be locally located (e.g., at the aircraft) or remotely located (e.g., at a hangar, office, or other remote physical location) relative to WUI device 260, e.g., using 802.11 Wi-Fi, LTE, WiMAX, etc. Examples of selectable modes of operation for WCDT 232 that may be wirelessly controlled by WUI 260 include, but are not limited to, munitions fire test, built-in test (BIT), stray voltage test, fire test, munitions misfire detection and correction test, jettison test, etc., and/or any other modes of operation that may be performed in a non-wireless manner using a conventional CDT 132. Diagnostic data that may be collected by WCDT 232 and wirelessly communicated to WUI 260 for display or storage include, but are not limited, to, count of valid fire pulses, timing and numbering of valid fire pulses, limiting of dual squib fire pulses, bad ground or contact spring, no fire positions, sequence of fired positions, etc., and/or any other diagnostic data that may be collected in non-wireless manner by a conventional CDT 132.

Still referring to FIG. 3C, processing device 302 is also shown coupled to transceiver 304 that is provided for exchanging incoming and outgoing wireless communications via WCDT antenna 236 with WUI 260 via its antenna 262. As further shown, WCDT 232 includes actuation circuitry that in this embodiment includes mechanical actuators 310 (e.g., linear solenoids, screw jacks, traveling nut linear actuator, or other suitable electro-mechanical actuators) that are each individually controlled by processing device 302 in response to wireless user commands received from WUI 260 (e.g., based on remote user input to a user interface of WUI 260) to selectively actuate and independently move each respective one of payload type and presence coding plunger pins 355 into and out of contact with a corresponding one of payload identification and magazine presence switches 336 of switch interface 334 of dispenser system 230 so as to simulate the presence of a munitions container having a particular pattern of protruding and non-protruding fixed posts 299 that encodes information regarding type or combination of types of munitions loaded into the munitions compartments of the simulated munitions container, i.e., as simulated by the pattern of automated plunger pins 355 that are selected and actuated to extend outward from breech plate adapter 391 to depress one or more switches 336 of dispenser system 230. This may advantageously be done without requiring presence of a technician to manually depress plunger pins 155 of a conventional CDT 132 received in dispenser bucket 230.

As further shown, WCDT 232 also includes firing test interface circuitry 312 that is coupled to pin-type contacts 361 and ring type ground contacts 363 that are arranged and configured to electrically mate at an interface with respective firing contacts 349 and ground contacts 351 of dispenser bucket system 230, such that a fire signal 340 (or alternatively an electrical-continuity measurement signal) may be received from a CMDS sequencer 222 during testing and communicated to firing test interface 312 through munitions interface. Processing device 302 may monitor firing test interface 312 and detect receipt (or non-receipt) of fire command signals 340 received across each individual set of mated contact pairs 361/363 and 349/351 (i.e., each set of mated contacts corresponding to a fire command transmitted to a given one of the simulated munitions compartment 190) and report this firing signal receipt information (e.g., confirming successful receipt of each individual compartment firing command signal and/or confirming successful receipt of all individual compartment firing command signals) to WUI 260 via wireless communication. Further, firing test interface circuitry 312 may be configured with circuitry (e.g., individual electro-mechanical or servo-operated switches or other suitable controllable electrical switching circuitry) that is controllable to selectably change electrical continuity (e.g., open or short circuit) that exists at any given time across each given respective pair of pin-type contacts 361 and ring type ground contacts 363 in response to control signals provided by processing device 302, which may in turn be provided in response to wireless user commands received by WCDT 232 from WUI 260 (e.g., based on remote user input to a user interface of WUI 260). Thus, for example, a user may use WUI 260 to remotely control electrical continuity of one or more of WCDT contact pairs 361 and 363 so as to selectably simulate presence or absence of unfired munitions to controller 220 via each pair of firing contacts 349 and ground contacts 351 of dispenser bucket system 230, and monitor the results of this simulation, e.g., simultaneously or in real time via a user interface coupled to controller 220.

FIG. 4 illustrates a block diagram of a wireless CMDS testing system, and in particular shows the communication relationship between wireless components of the CMDS system of FIG. 2 when it is configured in testing mode with a WCDT 232 installed into the cavity 229 of each of multiple dispenser systems 230. These wireless components include WUI 260, WCDTs 232, and optional wireless router 250. It will be understood that a wireless router 250 or other type of wireless access point or intermediary wireless device may be desirable for ensuring sufficient wireless communication range for larger types of aircraft 210 having dispenser systems 230 that are spaced apart from the cockpit by relatively large distances, such as Lockheed C-5 Galaxy, Boeing 747, Airbus A-380, etc. In the exemplary embodiment of FIG. 4, WUI 260 itself is configured as shown with a processing device in the form of a central processing unit (CPU) 402, NVRAM 404, random active memory (RAM) 406, display controller 408, a coupled display 410 (e.g., interactive liquid crystal touch screen display), and optionally another form of input/output interface 420 for a user, such as a computer keyboard, touchpad, mouse, etc. Wireless communication circuitry in the form of a transceiver 414 in this embodiment is coupled as shown between processing device 402 and an antenna 262 to enable wireless communication with other wireless components of the CMDS system. In this exemplary embodiment, WUI 260 also includes a battery 412 for powering its components and may be, for example, a portable battery-powered device such as a commercial off the shelf (COTS) tablet computer, smart phone, notebook computer, etc. However, it will be understood that a WUI 260 may alternatively be any type of portable wireless-capable device that includes at least one processing device that is capable of performing the tasks of WUI 260 described herein.

In the illustrated embodiment of FIG. 4, WUI 260 is shown communicating wirelessly from its antenna 262 with multiple WCDTs 232 (e.g., each having components described and illustrated in FIG. 3C) via an optional router 250 having antenna 252, e.g., using Wi-Fi protocol such as IEEE 802.11a/b/g/n, or any other wireless communication medium or technique. Router 250 may be a COTS wireless router or any other intermediary wireless device configured to repeat wireless signals and/or route wireless data network traffic between multiple wireless devices. It will be understood however, that in another embodiment, WUI 260 may communicate directly with one or more WCDTs 232 by wireless signals with no intermediary wireless device employed.

During wireless testing operations of a CMDS system such as illustrated in FIG. 2 (e.g., an AN/ALE-47 system), a respective WCDT 232 may be installed into one or more individual dispenser buckets 230, e.g., from the exterior of the aircraft 210, in a manner as illustrated in FIG. 3C. Once so installed, a single remotely located maintenance technician located in the cockpit of aircraft 210 may control testing of each of the countermeasure dispenser systems 230 (e.g., six, eight, or more dispenser buckets) installed on aircraft 210 by entering operational commands (e.g., such as manual, auto or semi fire commands, etc.) for each dispenser bucket into the controller 220, while at the same time performing functionality checks of the CMDS by wirelessly controlling and monitoring each of the WCDTs 232 using a WUI 260, without ever leaving the cockpit. During CMDS testing, the mode or settings for each individual WCDT 232 may be remotely and wirelessly changed as many times as necessary during the duration of the test. For example, each WCDT 232 may be changed from a stray voltage check to a fire test for its respective dispenser system 260. Similarly each WCDT 232 may be wirelessly controlled to test its respective dispenser system 260 in each of multiple munitions modes (e.g., such as flare, chaff, custom munitions definitions O1 and O2) by selectively controlling actuators 310 and contacts 332 to make connection with respective dispenser-side munitions interface connectors 336. Diagnostic data (e.g., such as the fire count data) that is collected during this testing process by each given WCDT 232 for its respective dispenser bucket may be displayed and reviewed in real time at the remote cockpit location by the single technician.

Figure 5:
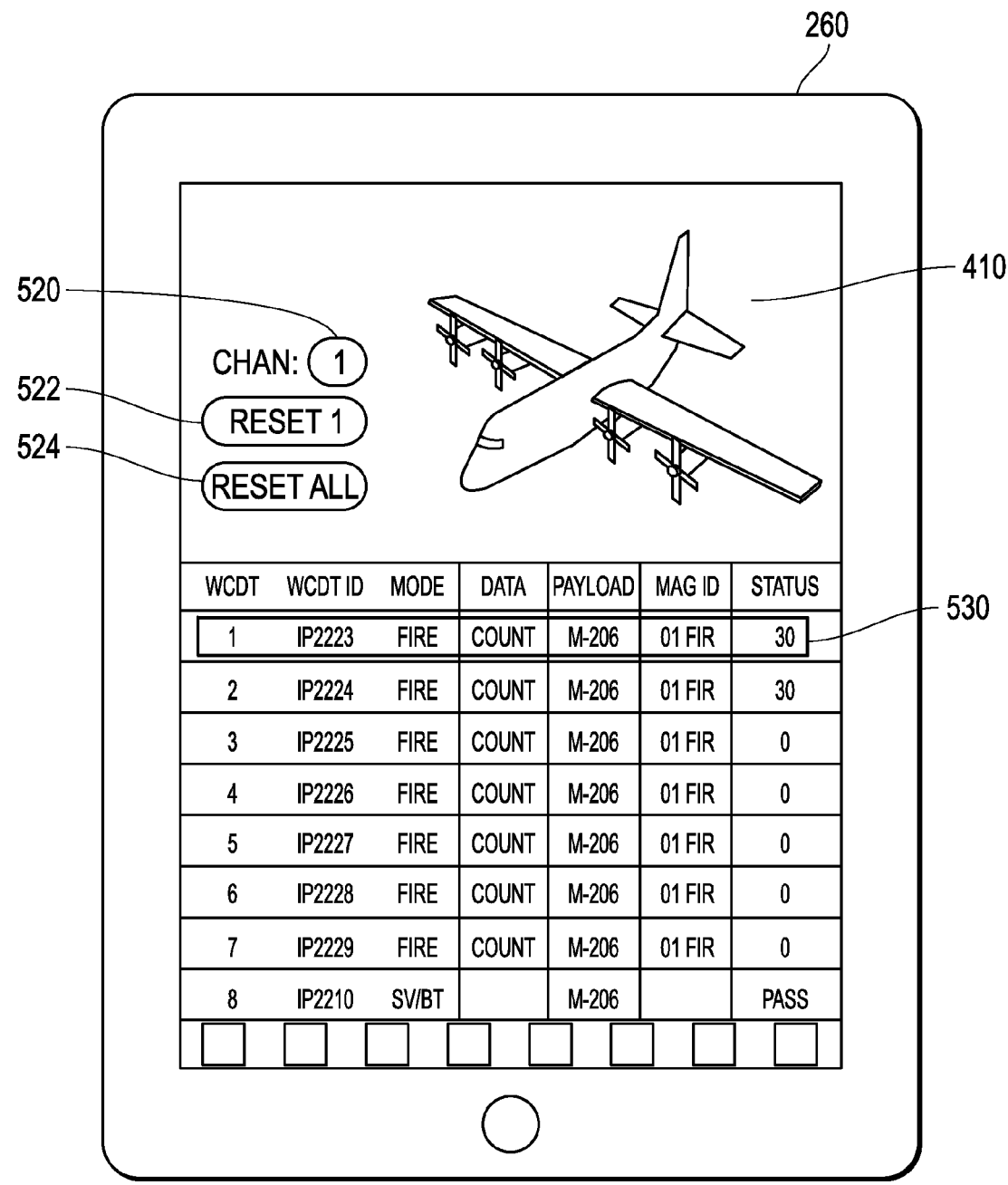
FIG. 5 illustrates one exemplary embodiment of a wireless user interface system according to one exemplary embodiment of the disclosed systems and methods.

FIG. 5 illustrates one exemplary embodiment of a WUI 260 in the form of a tablet computer having a display 410 that in this exemplary embodiment is configured as a tablet computer touch screen that displays to a user an interactive GUI containing real time parameters (e.g., including monitored status and diagnostic data) from each of eight WCDTs 232 of the CMDS system, and that also allows a user (e.g., technician that is remotely located to each of WCDTs 232) to control operation of each of the eight WCDTs 232 to test its respective dispenser system 230 in a manner as described elsewhere herein. As shown in FIG. 5, each of wirelessly coupled WCDTs 232 is identified in a table of the GUI display that has seven columns and eight rows for indicating monitored status and data for each of the WCDTs 232. In this exemplary embodiment displayed columns of the table include:

524 is provided to allow a user to reset all WCDTs. A movable highlight window 430 may also be manipulated by user touch to highlight a given row of the displayed table corresponding to a particular WCDT 232 (e.g., corresponding to any of WCDTs 1-8) for purposes of controlling or changing the individual WCDT to different operating modes or reset.

It will be understood that the particular illustrated format of the GUI of FIG. 5, as well as the particular parameters and touch areas shown displayed by the GUI of FIG. 5 are exemplary only, and that other display formats may be employed and/or other parameters may be displayed. Moreover, it will also be understood that other features of WCDT and CMDS testing may be controlled by a user employing the GUI of FIG. 5. In one exemplary embodiment, a wireless CMDS system and its WUI 260 may be configured to wirelessly implement all testing functionalities (including user control features and information display features) offered by a conventional manual user interface 133 of a conventional non-wireless CDT 132 as shown and described in relation to FIG. 1B.

Figure 6:
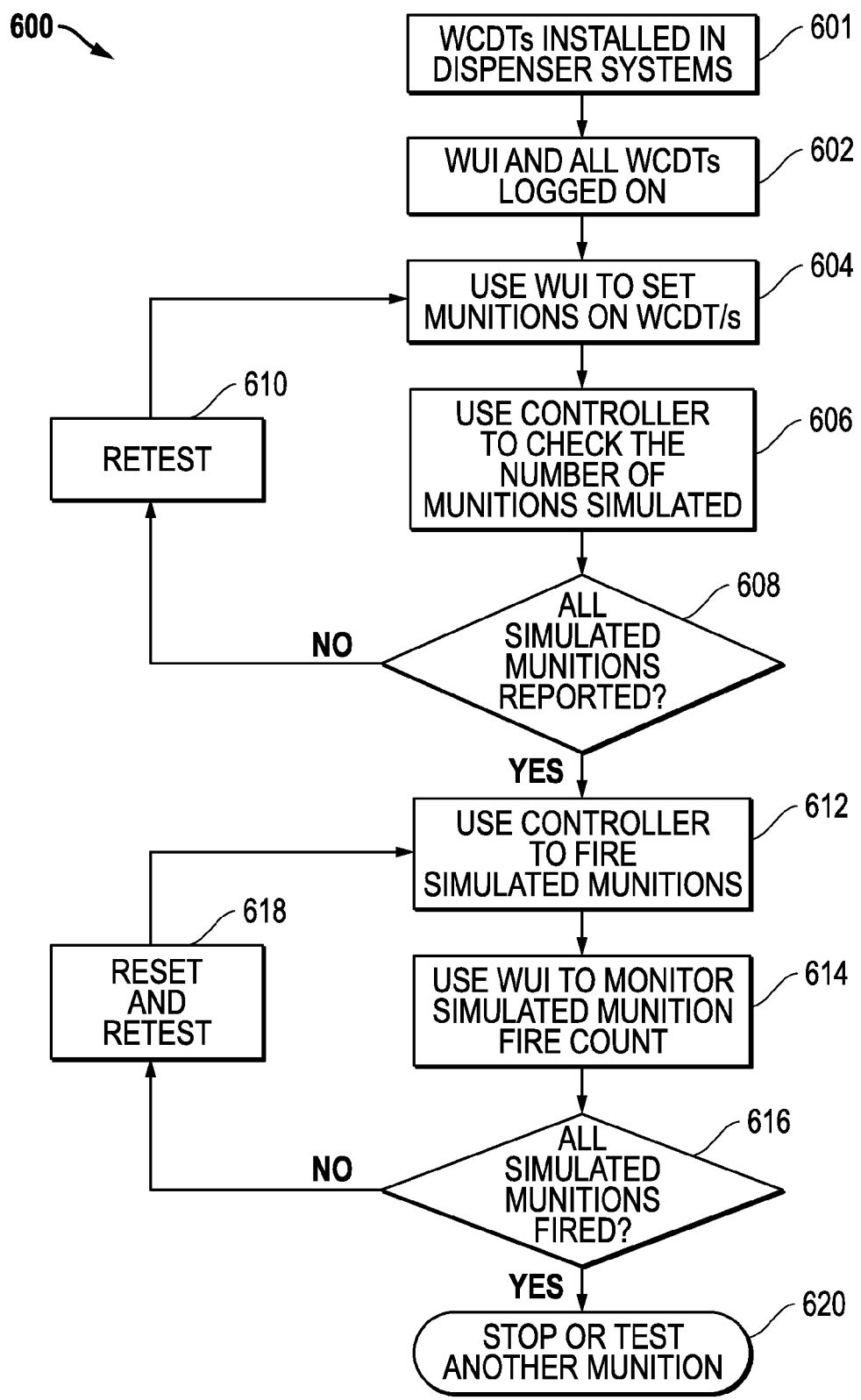
FIG. 6 illustrates countermeasure dispenser system testing methodology according to one exemplary embodiment of the disclosed systems and methods.

FIG. 6 illustrates CMDS testing methodology 600 as it may be employed in one exemplary embodiment to test a CMDS system such as illustrated in FIG. 2, while aircraft 210 is parked on the ground prior to a flight operation mission. In FIG. 6 methodology 600 starts in step 601 where WCDTs 232 are installed into the dispenser systems (e.g., buckets) of a CMDS system. Next in step 602, and WUI 260 and all installed WCDTs 232 are turned on and logged on to a common wireless network, e.g., via an IEEE 802.11-based wireless router 250 or other suitable intermediary wireless device, or using any other suitable wireless networking protocol with or without a separate router 250 or other type of access point (e.g., such as direct peer-to-peer network interconnection between WUI 260 and each of WCDTs 232).

---

1) "WCDT" -- identification number within the CMDS system (e.g., 1-8)
2) "WCDT ID" (e.g., IP2223, IP222, etc.) -- corresponds to IP address of each WCDT 232
3) "MODE" -- current operation mode of each WCDT 232 (e.g., "FIRE" mode displaying a current Fire mode setting for WCDTs 1-7 and Stray Voltage/Built-In Test ("SV/BIT") mode displaying a current Stray Voltage mode setting for WCDT 8)
4) "DATA" -- type of diagnostic data currently being collected for each WCDT 232 (e.g., "COUNT" meaning that Fire Count data is being collected for WCDTs 1-7 and S.V./BIT PASS/FAIL for WCDT 8)
5) "PAYLOAD" -- type of munitions cartridge currently being simulated by each WCDT 232 (e.g., "M-206" munitions cartridge being simulated by each of WCDTs 1-8)
6) "MAG ID" -- indicates what type of munitions is being simulated by plunger pins 355 (e.g., "O1 FLR" meaning custom defined Other 1 Flare) for each of WCDTs 1-7, and S.V./BIT meaning Stray Voltage/Built In Test for WCDT 8)
7) "STATUS" -- current collected value of diagnostic data for each WCDT 232 (e.g., fire count value of "30" meaning the CMDS system successfully communicated firing signals for 30 munitions container compartments 390 to WCDTs 1 and 2, fire count of "0" meaning no fire signals detected for WCDTs 3-7, and "PASS" meaning Stray Voltage or Built-in test has Passed for WCDT 8.

---

Still referring to the exemplary embodiment of FIG. 5, the displayed GUI of display 410 also includes designated user touch areas 520, 522, 524 and 530 for allowing a user to input control commands for wireless communication to each of WCDTs 232 so as to control operation of the WCDTs 232 in a manner as described herein. In this regard, "CHAN" touch area 520 is provided to allow a user to control WCDT network, and "RESET 1" touch area 522 is provided to allow a user to reset of individual selected WCDTs. In this embodiment, the "CHAN" number will change based on which WCDT is selected by the touch screen (WCDT 1 is pictured selected in FIG. 5) and "RESET ALL" touch area In step 604, a user (e.g., such as technician located in cockpit of aircraft 210) selects a particular type of munitions (e.g., flares, chaff, etc.) that is to be simulated by each installed WCDT 232. In this regard, a user may use a touch screen GUI or other input interface of WUI 260 to select the same type of simulated munitions for all WCDTs 232 or different types of munitions for different WCDTs 232, and a corresponding selection command for each WCDT 232 is wirelessly communicated from the WUI 260 to each given WCDT 232. Each given WCDT 232 responds to the wireless selection command of step 604 by configuring (e.g., by retracting and extending as needed) its individual plunger pins 355 relative to the respective depressable switches 336 of the corresponding dispenser system 230 in a manner to create a pattern of extended plunger pins that encodes (i.e., indicates) the particular simulated munitions load that was selected by the user for the given WCDT 232 in step 604 (e.g., such as a simulated full or partial load of 30 munitions of user selected type/s of munitions). At this time a user may also may use WUI 260 to control the electrical continuity (e.g., short or open circuit) presented between each pair of contacts 361 and 363 of WCDT 232 to each corresponding pair of firing contacts 349 and 351 of dispenser bucket system 130 so as to simulate presence or absence of unfired munitions corresponding to each mating firing contacts 349 and 351 of dispenser bucket system 130 as desired to fit the given test scenario (e.g., given number and/or compartment location of unfired munitions to be simulated).

Next, in step 606, the user checks the number and type/s of loaded munitions reported to the CMDS controller 220 as being present by each dispenser system 230 (e.g., reported as munitions identification signals 342 across hardware communication path 240) based on the selected simulated munitions input provided by its corresponding WCDT 232. In this regard, a user may view a display and user interface of the controller 220 to select and view the number of installed munitions reported across hardware path 240 via sequencers 222 by each dispenser system 230. If in step 608 a given dispenser system 230 does not report a full load of the selected munitions being simulated by its corresponding WCDT 232 (e.g., dispenser system 230 reports no simulated munitions or reports less than a full load of munitions as being present), then the user may proceed to step 610 and wirelessly initiate a retest of the given dispenser system 230 by repeating step 604 as shown. This may be done, for example, by using WUI 260 to wirelessly reset and retest the given dispenser system 230.

Once the controller 220 indicates to the user in step 608 that all munitions being simulated by the WCDTs 232 are reported loaded and present by the tested dispenser systems 230 to the controller 220, then in step 612 the user may then use the input/output interface of the controller 220 to transmit firing commands 340 across hardware path 240 to each of tested dispenser systems 230 via sequencers 222. Each WCDT 232 detects whether or not a firing command is successfully received across mating pairs of contacts 349/351 and 361/363 from the dispenser system 230 to fire each of the munitions of the full load of simulated munitions, and wirelessly reports this information in step 614 as fire count information to WUI 260 where a corresponding fire count is displayed to the user such as illustrated in FIG. 5. If in step 616 the WCDT 232 corresponding to each given tested dispenser system 230 does not wirelessly report a fire count received for all simulated munitions for that given tested dispenser system 230, then the user may proceed to step 618 and wirelessly initiate a retest of the given dispenser system 230 by repeating step 612 as shown. This may be done, for example, by using WUI 260 to wirelessly reset and retest the given dispenser system 230. At this time or any other time a user may also may use WUI 260 to control the state of electrical continuity (e.g., short or open circuit) presented between each pair of contacts 361 and 363 of WCDT 232 to each corresponding pair of firing contacts 349 and 351 of dispenser bucket system 130 so as to simulate transition from unfired to fired condition of munitions corresponding to each mating firing contacts 349 and 351 of dispenser bucket system 130 to fit the given test scenario (e.g., given number and location of simulated munitions that are fired).

In one exemplary embodiment, processing device 302 may be optionally configured to automatically control the state of electrical continuity (open or short circuit) presented between each pair of contacts 361 and 363 of WCDT 232 so as to change the electrical continuity from unfired munition state (short or closed circuit) to fired munition state (open circuit) at the pair of firing contacts 349 and 351 of each simulated munitions location where a firing command was successfully received in step 616 such that a realistic fired munitions condition may be provided to controller 220 and a user thereof in real time as munitions firing is simulated.

Once the WUI 260 indicates to the user in step 616 that a fire count has been received for all simulated munitions of all tested dispenser systems 230, then methodology 600 may proceed as shown to step 620 where the CMDS system testing ends, or may proceed by testing another simulated type of munitions, in which case methodology 600 may be repeated by returning to step 604 and repeating CMDS testing for a different selected type of simulated munitions. Once all desired simulated munitions have been successfully wirelessly tested according to methodology 600 using WCDTs 232 and WUI 260, the WCDTs 232 may be removed from each dispenser system 230 and replaced by multi-munitions containers 235 of FIG. 3C, into the compartments 390 of which may be loaded actual live munitions prior to conducting flight operations using aircraft 210.

It will be understood that the particular steps of methodology 600 are exemplary only, and that additional, fewer, and/or alternative steps may be employed during wireless testing of the dispenser systems 230 of a CMDS system such as illustrated in FIG. 2.

It will be understood that one or more of the tasks, functions, or methodologies described herein (e.g., including those performed by systems such as WCDT 232, WUI 260, controller 220, programmer 228, sequencer 222 and dispenser system 230) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium residing on or accessible by one or more processing devices for instructing a given system to execute the computer program of instructions. The computer program of instructions may include an ordered listing of executable instructions for implementing logical functions in the device. The executable instructions may comprise a plurality of code segments operable to instruct the system to perform the methodology disclosed herein. It will also be understood that one or more steps of the present methodologies may be employed in one or more code segments of the computer program. For example, a code segment executed by the system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system for wireless testing of a countermeasure dispenser system (CMDS), comprising:
at least one wireless countermeasure dispenser testing (WCDT) system comprising wireless communication circuitry and being configured to be received in a munitions cavity of a countermeasure dispenser of the CMDS to at least one of:
gather diagnostic data regarding operation of the countermeasure dispenser and wirelessly transmit the gathered diagnostic data, or
test one or more operating features of the countermeasure dispenser, or
a combination thereof; and
at least one wireless user interface (WUI) system having wireless communication circuitry, the WUI system being configured to at least one of:
transmit wireless test control signals to control operation of the WCDT system to test one or more operating features of the countermeasure dispenser, or
receive wireless-transmitted gathered diagnostic data from the WCDT system and at least one of display, store or wirelessly retransmit information that is based on the gathered diagnostic data, or
a combination thereof;
where the WCDT system is configured to:
selectably actuate payload identification and magazine presence switches of the countermeasure dispenser in response to wireless test control signals received from the WUI system,
receive munitions firing signals from firing contacts of the countermeasure dispenser, and
wirelessly transmit munitions firing information to the WUI system, the munitions firing information reporting the receipt or non-receipt of the munitions firing signals from the firing contacts of the countermeasure dispenser;
where the WUI system is configured to:
transmit wireless test control signals to control operation of the WCDT to selectably actuate the payload identification and magazine presence switches of the countermeasure dispenser to simulate presence and/or type of munitions contained within the countermeasure dispenser,
receive the wireless-transmitted munitions firing information from the WCDT, and
at least one of display, store, or wirelessly retransmit information that is based at least in part on the wireless-transmitted munitions firing information; and
where the WCDT system comprises:
wireless communication and processing circuitry configured to exchange wireless communication signals with the wireless user interface (WUI) system,
one or more extendable and retractable plunger pins that are each configured to selectably extend from the WCDT to selectably depress a respective multi-position payload identification and magazine presence switch of the countermeasure dispenser when the WCDT is received within the munitions cavity of the countermeasure dispenser,
actuation circuitry coupled to the wireless communication and processing circuitry and including at least one mechanical actuator mechanically coupled to each of the respective moveable plunger pins, the mechanical actuator being configured to selectably extend and retract a respective one of the plunger pins in response to respective plunger control signals received from the wireless communication and processing circuitry that are provided in response to wireless test control signals received from the WUI system, and
firing test interface circuitry coupled to the wireless communication and processing circuitry and configured to interface with one or more firing contacts of the countermeasure dispenser when the WCDT is received within the munitions cavity of the countermeasure dispenser, the firing test interface circuitry being configured to receive respective munitions firing signals from the firing contacts of the countermeasure dispenser, and the wireless communication and processing circuitry being configured to wirelessly report the receipt of the munitions firing signals to the WUI system as munitions firing information.

2. The system of claim 1,
where the WUI system is configured to perform at least one of the following steps from a location that is physically remote to the WCDT:
transmit wireless test control signals to control operation of the WCDT system to test one or more operating features of the countermeasure dispenser, or
receive wireless-transmitted gathered diagnostic data from the WCDT system and at least one of display, store or wirelessly retransmit information that is based on the gathered diagnostic data, or
a combination thereof.

3. The system of claim 1, where the WUI system further comprises at least one processing device coupled to a display, a user input/output (I/O) interface and the wireless communication circuitry, the processing device of the WUI system being configured to:
receive user input from the user I/O interface and respond to the user input by controlling the wireless communication circuitry to transmit the wireless test control signals to control operation of the WCDT system to selectably actuate the payload identification and magazine presence switches of the countermeasure dispenser in a manner according to the user input; and
receive the wireless-transmitted munitions firing information from the WCDT system and control the user display to display information that is based on the wireless-transmitted munitions firing information.

4. The system of claim 1, where the WCDT system is configured to selectably change electrical continuity presented to at least one given pair of firing contacts of the countermeasure dispenser to selectably simulate presence or absence of unfired munitions corresponding to the given pair of firing contacts of the countermeasure dispenser in response to wireless test control signals received from the WUI system.

5. The system of claim 1, where the WUI system further comprises at least one processing device coupled to a display, a user input/output (I/O) interface and the wireless communication circuitry, the processing device of the WUI system being configured to:
receive user input from the user I/O interface and respond to the user input by controlling the wireless communication circuitry to transmit the wireless test control signals to control operation of the WCDT to test one or more operating features of the countermeasure dispenser according to the user input; and
receive the wireless-transmitted gathered diagnostic data from the WCDT and control the user display to display information that is based on the wireless-transmitted gathered diagnostic data.

6. The system of claim 1, further comprising at least one intermediary wireless device configured to route wireless communication signals between the WUI and the WCDT.

7. The system of claim 1, where the WUI and WCDT are configured to wirelessly communicate using IEEE 802.11-based wireless protocol signals.

8. The system of claim 1, where the WUI system is a portable wireless device that comprises at least one of a smart phone, tablet computer, or notebook computer.

9. A method for wireless testing of a countermeasure dispenser system (CMDS) that includes at least one countermeasure dispenser and a controller coupled to the countermeasure dispenser for monitoring and controlling the programming and dispensing of munitions from the countermeasure dispenser, the method comprising:
providing at least one wireless countermeasure dispenser testing (WCDT) system comprising wireless communication circuitry in a munitions cavity of a countermeasure dispenser of the CMDS; providing at least one wireless user interface (WUI) system comprising wireless communication circuitry; and at least one of:
using the WCDT system to gather diagnostic data regarding operation of the countermeasure dispenser and wirelessly transmit the gathered diagnostic data from the WCDT system to the WUI system, and using the WUI system to receive the wireless-transmitted gathered diagnostic data from the WCDT system and to at least one of display, store or wirelessly retransmit information that is based on the gathered diagnostic data, or
using the WUI system to transmit wireless test control signals from the WUI system to the WCDT system, and using the WCDT to receive the wireless test control signals and to respond to the received wireless test control signals by testing one or more operating features of the countermeasure dispenser based upon the received wireless test control signals, or
a combination thereof;
where the method further comprises:
using the WUI to transmit wireless test control signals to control operation of the WCDT system to selectably actuate one or more payload identification and magazine presence switches of the countermeasure dispenser to simulate presence and/or type of munitions contained within the countermeasure dispenser, and using the CMDS controller to monitor the payload identification and presence reported by the countermeasure dispenser in response to the simulated presence and/or type of munitions contained within the countermeasure dispenser, and
using the CMDS controller to cause the countermeasure dispenser to produce munitions firing signals at the firing contacts of the countermeasure dispenser, using the WCDT system to receive the munitions firing signals from the firing contacts of the countermeasure dispenser, using the WCDT system to wirelessly transmit munitions firing information to the WUI system, the munitions firing information reporting the receipt or non-receipt of the munitions firing signals from the firing contacts of the countermeasure dispenser, and using the WUI system to receive the wireless-transmitted munitions firing information from the WCDT and at least one of display, store, or wirelessly retransmit information that is based at least in part on the wireless-transmitted munitions firing information; and
where the WCDT system comprises wireless communication and processing circuitry, one or more extendable and retractable plunger pins, actuation circuitry including a mechanical actuator that is mechanically coupled to each of the respective moveable plunger pins and that is coupled to be controlled by the wireless communication and processing circuitry, and firing test interface circuitry coupled to the wireless communication and processing circuitry; and
where the method further comprises:
using the wireless communication and processing circuitry to exchange wireless communication signals with the wireless user interface (WUI) system,
using the actuation circuitry to selectably extend at least one of the plunger pins from the WCDT in response to respective plunger control signals received from the wireless communication and processing circuitry that are provided in response to the wireless test control signals received from the WUI system to selectably depress a respective multi-position payload identification and magazine presence switch of the countermeasure dispenser when the WCDT is received within the munitions cavity of the countermeasure dispenser,
using the firing test interface circuitry to receive respective munitions firing signals from the firing contacts of the countermeasure dispenser, and
using the wireless communication and processing circuitry to wirelessly report the receipt of the munitions firing signals to the WUI system as munitions firing information.

10. The method of claim 9, further comprising providing the at least one wireless user interface (WUI) system at a location that is physically remote to the WCDT, the WUI being separate from the CMDS controller; and at least one of:
using the WCDT system to gather diagnostic data regarding operation of the countermeasure dispenser and wirelessly transmit the gathered diagnostic data from the WCDT system to the WUI system, and using the WUI system to receive the wireless-transmitted gathered diagnostic data at the physically remote location from the WCDT system and to at least one of display, store or wirelessly retransmit information that is based on the gathered diagnostic data; or
using the WUI system to transmit wireless test control signals from the WUI system at the physically remote location to the WCDT system, and using the WCDT to receive the wireless test control signals and to respond to the received wireless test control signals by testing one or more operating features of the countermeasure dispenser based upon the received wireless test control signals, or
a combination thereof.

11. The method of claim 9, where the WUI system further comprises at least one processing device coupled to a display, a user input/output (I/O) interface and the wireless communication circuitry; and where the method further comprises using the processing device of the WUI system to:
receive user input from the user I/O interface and respond to the user input by controlling the wireless communication circuitry to transmit the wireless test control signals to control operation of the WCDT system to selectably actuate the payload identification and magazine presence switches of the countermeasure dispenser in a manner according to the user input; and
receive the wireless-transmitted munitions firing information from the WCDT system and control the user display to display information that is based on the wireless-transmitted munitions firing information.

12. The method of claim 9, where the WCDT system comprises wireless communication and processing circuitry and controllable electrical switching circuitry coupled to be controlled by the wireless communication and processing circuitry to change electrical continuity presented to at least one given pair of firing contacts of the countermeasure dispenser; and where the method further comprises:
using the electrical switching circuitry to selectably change electrical continuity presented to the given pair of firing contacts of the countermeasure dispenser to selectably simulate presence or absence of unfired munitions corresponding to the given pair of firing contacts of the countermeasure dispenser in response to control signals received from the wireless communication and processing circuitry that are provided in response to the wireless test control signals received from the WUI system.

13. The method of claim 9, where the WUI system further comprises at least one processing device coupled to a display, a user input/output (I/O) interface and the wireless communication circuitry; and where the method further comprises using the processing device of the WUI system to:
receive user input from the user I/O interface and respond to the user input by controlling the wireless communication circuitry to transmit the wireless test control signals to control operation of the WCDT to test one or more operating features of the countermeasure dispenser according to the user input; and
receive the wireless-transmitted gathered diagnostic data from the WCDT and control the user display to display information that is based on the wireless-transmitted gathered diagnostic data.

14. The method of claim 9, where the CMDS is installed on an aircraft and includes multiple countermeasure dispensers permanently installed at different external locations around the aircraft; where the CMDS controller is located within a cockpit of the aircraft; and where the method further comprises providing a different wireless countermeasure dispenser testing (WCDT) system in the respective munitions cavity of each of the multiple countermeasure dispensers of the CMDS; and at least one of:
using each of the given WCDT systems to gather diagnostic data regarding operation of one of the countermeasure dispensers and to wirelessly transmit the gathered diagnostic data from the given WCDT system to the WUI system, and using the WUI system to simultaneously monitor the multiple WCDT systems by receiving the wireless-transmitted gathered diagnostic data from each of the given WCDT systems and to at least one of display, store or wirelessly retransmit information that is based on the gathered diagnostic data; or
using the WUI system to transmit wireless test control signals from the WUI system to simultaneously control the multiple WCDT systems by causing the WCDT systems to receive the wireless test control signals and to respond to the received wireless test control signals by testing one or more operating features of each respective one of the countermeasure dispensers based upon the received wireless test control signals, or
a combination thereof.

15. A wireless countermeasure dispenser testing (WCDT) system configured to be received in a munitions cavity of a countermeasure dispenser of a countermeasure dispenser system (CMDS), the WCDT system comprising system circuitry configured to at least one of:
gather diagnostic data regarding operation of the countermeasure dispenser and wirelessly transmit the gathered diagnostic data; or
receive and respond to wireless test control signals by controlling operation of the WCDT system to test one or more operating features of the countermeasure dispenser; or
a combination thereof; and
where the system comprises:
wireless communication and processing circuitry configured to exchange wireless communication signals with a wireless user interface (WUI) system;
one or more extendable and retractable plunger pins that are each configured to selectably extend from the WCDT to selectably depress a respective multi-position payload identification and magazine presence switch of the countermeasure dispenser when the WCDT is received within the munitions cavity of the countermeasure dispenser;
actuation circuitry coupled to the wireless communication and processing circuitry and including at least one mechanical actuator mechanically coupled to each of the respective moveable plunger pins, the mechanical actuator being configured to selectably extend and retract a respective one of the plunger pins in response to respective control signals received from the wireless communication and processing circuitry that are provided in response to wireless test control signals received from the WUI system;
firing test interface circuitry coupled to the wireless communication and processing circuitry and configured to interface with one or more firing contacts of the countermeasure dispenser when the WCDT is received within the munitions cavity of the countermeasure dispenser, the firing test interface circuitry being configured to receive respective munitions firing signals from the firing contacts of the countermeasure dispenser, and the wireless communication and processing circuitry being configured to wirelessly transmit munitions firing information to the WUI system, the munitions firing information reporting the receipt or non-receipt of the munitions firing signals from the firing contacts of the countermeasure dispenser.

16. The WCDT system of claim 15, where the WCDT system comprises system circuitry configured to at least one of gather diagnostic data regarding operation of the countermeasure dispenser and wirelessly transmit the gathered diagnostic data to a physically remote location, receive and respond to wireless test control signals received from a physically remote location by controlling operation of the WCDT system to test one or more operating features of the countermeasure dispenser, or a combination thereof.

17. The WCDT system of claim 15, where the system circuitry is configured to receive and respond to wireless test control signals by controlling operation of the WCDT system to test one or more operating features of the countermeasure dispenser; and to gather diagnostic data regarding operation of the countermeasure dispenser and wirelessly transmit the gathered diagnostic data.

18. The WCDT system of claim 15, the wireless communication and processing circuitry comprises at least one processing device coupled to the actuation circuitry, the firing test interface circuitry, and to at least one antenna element through wireless transceiver circuitry, the at least one processing device being configured to:
provide the munitions firing information to the wireless transceiver circuitry for wireless transmission to the WUI system via the antenna element; and
receive the incoming wireless test control signals from the WUI system via the antenna element and provide plunger pin actuation command signals to the actuation circuitry to cause the actuation circuitry to extend or retract one or more of the plunger pins.

19. The WCDT system of claim 15, where the WCDT system is configured to wirelessly transmit the gathered diagnostic data using IEEE 802.11-based wireless protocol signals, receive the wireless test control signals as IEEE 802.11-based wireless protocol signals, or a combination thereof.

20. The WCDT system of claim 15, where the WCDT further comprises a chassis enclosure, the backside of the chassis enclosure including a breech plate adapter; where the firing test interface circuitry comprises multiple firing contacts provided on the breech plate adapter that are arranged and configured to mate with respective breech plate firing contacts within the munitions cavity of a countermeasure dispenser; and where the firing test interface circuitry further comprises multiple corresponding ground contacts that are arranged and configured to mate with respective breech plate ground contacts of the countermeasure dispenser.

21. A system for wireless testing of a countermeasure dispenser system (CMDS), comprising:
at least one wireless countermeasure dispenser testing (WCDT) system comprising wireless communication circuitry and being configured to be received in a munitions cavity of a countermeasure dispenser of the CMDS to at least one of:
gather diagnostic data regarding operation of the countermeasure dispenser and wirelessly transmit the gathered diagnostic data, or
test one or more operating features of the countermeasure dispenser, or
a combination thereof; and
at least one wireless user interface (WUI) system having wireless communication circuitry, the WUI system being configured to perform at least one of the following steps from a location that is physically remote to the WCDT:
transmit wireless test control signals to control operation of the WCDT system to test one or more operating features of the countermeasure dispenser, or
receive wireless-transmitted gathered diagnostic data from the WCDT system and at least one of display, store or wirelessly retransmit information that is based on the gathered diagnostic data, or
a combination thereof;
where the CMDS is installed on an aircraft and includes multiple countermeasure dispensers permanently installed at different external locations around the aircraft and a CMDS controller located in a cockpit of the aircraft that is separate from the WUI and that is configured to monitor and control the programming and dispensing of munitions from the countermeasure dispensers; and where the system for wireless testing of the CMDS comprises:
multiple WCDT systems, a separate WCDT system being received in a munitions cavity of each of the countermeasure dispensers of the CMDS; and
where the WUI system is configured to perform at least one of the following steps from a location that is physically remote to each of the multiple separate WCDT systems:
transmit wireless test control signals to simultaneously control operation of the multiple WCDT systems to test one or more operating features of the multiple countermeasure dispensers, or
receive wireless-transmitted gathered diagnostic data from the multiple WCDT systems to simultaneously monitor the multiple WCDT systems and at least one of display, store or wirelessly retransmit information that is based on the gathered diagnostic data, or
a combination thereof.

22. The system of claim 21, where the physically remote location is a cockpit of the aircraft, or a hangar.

23. The system of claim 21, where the WUI system is configured to perform each of the following steps from a location that is physically remote to each of the multiple separate WCDT systems: transmit wireless test control signals to simultaneously control operation of the multiple WCDT systems; and receive wireless-transmitted gathered diagnostic data from the multiple WCDT systems to simultaneously monitor the multiple WCDT systems.

24. A method for wireless testing of a countermeasure dispenser system (CMDS) that includes at least one countermeasure dispenser and a CMDS controller coupled to the countermeasure dispenser for monitoring and controlling the programming and dispensing of munitions from the countermeasure dispensers, the method comprising: providing at least one wireless countermeasure dispenser testing (WCDT) system comprising wireless communication circuitry in a munitions cavity of a countermeasure dispenser of the CMDS; providing at least one wireless user interface (WUI) system at a location that is physically remote to the WCDT, the WUI being separate from the CMDS controller and comprising wireless communication circuitry; and at least one of:
using the WCDT system to gather diagnostic data regarding operation of the countermeasure dispenser and wirelessly transmit the gathered diagnostic data from the WCDT system to the WUI system, and using the WUI system to receive the wireless-transmitted gathered diagnostic data at the physically remote location from the WCDT system and to at least one of display, store or wirelessly retransmit information that is based on the gathered diagnostic data; or
using the WUI system to transmit wireless test control signals from the WUI system at the physically remote location to the WCDT system, and using the WCDT to receive the wireless test control signals and to respond to the received wireless test control signals by testing one or more operating features of the countermeasure dispenser based upon the received wireless test control signals, or a combination thereof;

where the physically remote location is a cockpit of the aircraft, or a hangar.

25. A method for wireless testing of a countermeasure dispenser system (CMDS) that includes at least one countermeasure dispenser and a CMDS controller coupled to the countermeasure dispenser for monitoring and controlling the programming and dispensing of munitions from the countermeasure dispensers, the method comprising: providing at least one wireless countermeasure dispenser testing (WCDT) system comprising wireless communication circuitry in a munitions cavity of a countermeasure dispenser of the CMDS; providing at least one wireless user interface (WUI) system at a location that is physically remote to the WCDT, the WUI being separate from the CMDS controller and comprising wireless communication circuitry; and at least one of:

using the WCDT system to gather diagnostic data regarding operation of the countermeasure dispenser and wirelessly transmit the gathered diagnostic data from the WCDT system to the WUI system, and using the WUI system to receive the wireless-transmitted gathered diagnostic data at the physically remote location from the WCDT system and to at least one of display, store or wirelessly retransmit information that is based on the gathered diagnostic data; or using the WUI system to transmit wireless test control signals from the WUI system at the physically remote location to the WCDT system, and using the WCDT to receive the wireless test control signals and to respond to the received wireless test control signals by testing one or more operating features of the countermeasure dispenser based upon the received wireless test control signals, or a combination thereof;

where the CMDS is installed on an aircraft and includes multiple countermeasure dispensers permanently installed at different external locations around the aircraft; where the CMDS controller is located within a cockpit of the aircraft; and where the method further comprises providing a different wireless countermeasure dispenser testing (WCDT) system in the respective munitions cavity of each of the multiple countermeasure dispensers of the CMDS; and at least one of:

using each of the given WCDT systems to gather diagnostic data regarding operation of one of the countermeasure dispensers and to wirelessly transmit the gathered diagnostic data from the given WCDT system to the WUI system, and using the WUI system to simultaneously monitor the multiple WCDT systems by receiving the wireless-transmitted gathered diagnostic data from each of the given WCDT systems and to at least one of display, store or wirelessly retransmit information that is based on the gathered diagnostic data, or using the WUI system to transmit wireless test control signals from the WUI system to simultaneously control the multiple WCDT systems by causing the WCDT systems to receive the wireless test control signals and to respond to the received wireless test control signals by testing one or more operating features of each respective one of the countermeasure dispensers based upon the received wireless test control signals, or a combination thereof; and where the method further comprises using the WUI system to simultaneously monitor the multiple WCDT systems by receiving the wireless-transmitted gathered diagnostic data from each of the given WCDT systems; and using the WUI system to transmit wireless test control signals from the WUI system to simultaneously control the multiple WCDT systems.

\* \* \* \* \*